US012463345B2

(12) United States Patent
Hussain et al.

(10) Patent No.: US 12,463,345 B2
(45) Date of Patent: Nov. 4, 2025

(54) SMALL DIMENSION UHF ANTENNA FOR CUBIC FORM SATELLITE

(71) Applicant: KING FAHD UNIVERSITY OF PETROLEUM AND MINERALS, Dhahran (SA)

(72) Inventors: Rifaqat Hussain, Dhahran (SA); Abdullah Mohammed Saeed Algarni, Dhahran (SA); Sharif Iqbal Mitu Sheikh, Dhahran (SA)

(73) Assignee: KING FAHD UNIVERSITY OF PETROLEUM AND MINERALS, Dhahran (SA)

( * ) Notice: Subject to any disclaimer, the term of this patent is extended or adjusted under 35 U.S.C. 154(b) by 0 days.

(21) Appl. No.: 19/211,351

(22) Filed: May 19, 2025

(65) Prior Publication Data

US 2025/0279586 A1 Sep. 4, 2025

Related U.S. Application Data

(63) Continuation of application No. 18/181,964, filed on Mar. 10, 2023, now Pat. No. 12,308,519.

(51) Int. Cl.

*H01Q 13/10* (2006.01)
*H01Q 1/28* (2006.01)
*H01Q 1/48* (2006.01)

(52) U.S. Cl.

CPC ........... *H01Q 13/103* (2013.01); *H01Q 1/288* (2013.01); *H01Q 1/48* (2013.01); *H01Q 13/106* (2013.01)

(58) Field of Classification Search

None

See application file for complete search history.

(56) References Cited

U.S. PATENT DOCUMENTS 7,463,197 B2 * 12/2008 Rafi .......................... H01Q 5/35 343/700 MS
7,994,999 B2 * 8/2011 Maeda ................. H01Q 9/0407 343/769
2017/0324142 A1 11/2017 Talty et al.

FOREIGN PATENT DOCUMENTS

CN 102522630 B 4/2014
CN 103794873 B 4/2016

(Continued)

OTHER PUBLICATIONS

Baek, et al.; Triple-Band Unidirectional Circularly Polarized Hexagonal Slot Antenna With Multiple L-Shaped Slits; IEEE Transactions on Antennas and Propagation, vol. 61, Issue 9; 3 Pages; Abstract Only.

(Continued)

*Primary Examiner* — Dameon E Levi
*Assistant Examiner* — Aladdin Abdulbaki
(74) *Attorney, Agent, or Firm* — Oblon, McClelland, Maier & Neustadt, L.L.P.

(57) ABSTRACT

A dual feed slot-based circularly polarized wideband ultra high frequency (UHF) antenna for a cubic shaped satellite (Cube-Sat) is described. The UHF antenna includes a circuit board, a metallic layer, a hexagonal meandered slot, a capacitor, a first feed horn, and a second feed horn. The circuit board has a front side and a back side separated by a dielectric material. The metallic layer covers the back side of the circuit board. The hexagonal meandered slot symmetrically includes six legs of equal length and six vertexes. The capacitor is switchably connected to the metallic layer. The first feed horn is connected by a first feed line to a first edge of the front side of the circuit board. The second feed horn is connected by a second feed line to a second edge of the front side of the circuit board.

9 Claims, 12 Drawing Sheets

(56) References Cited

FOREIGN PATENT DOCUMENTS

| | | | |
|---|---|---|---|
| CN | 107978852 | A | 5/2018 |
| TW | 201031051 | A | 8/2010 |
| WO | 2014/080360 | A2 | 5/2014 |

OTHER PUBLICATIONS

Farhood et al.; Design and analysis of dual band integrated hexagonal shaped microstrip UWB antenna ; Indonesian Journal of Electrical Engineering and Computer Science, vol. 15, No. 1 ; Jan. 25, 2019; 7 Pages.

Hussain, et al.; Dual Sense Circularly Polarized Compact Slot Antenna for CubeSat Applications; IEEE Access; Oct. 27, 2022; 6 Pages.

* cited by examiner

1100

SMALL DIMENSION UHF ANTENNA FOR CUBIC FORM SATELLITE

CROSS-REFERENCE TO RELATED APPLICATIONS

The present application is a Continuation of U.S. application Ser. No. 18/181,964, now allowed, having a filing date of Mar. 10, 2023.

STATEMENT REGARDING PRIOR DISCLOSURE BY THE INVENTORS

Aspects of this technology are described in an article "Dual Sense Circularly Polarized Compact Slot Antenna For CubeSat Applications" published in IEEE Access, on Oct. 5, 2022, which is incorporated herein by reference in its entirety.

STATEMENT OF ACKNOWLEDGEMENT

The inventor(s) acknowledge the financial support provided by the King Fahd University of Petroleum and Minerals (KFUPM), Riyadh, Saudi Arabia through Project #SR201009.

BACKGROUND

Technical Field

The present disclosure is directed to a dual polarized ultra-high frequency (UHF) band CubeSat antenna.

Description of Related Art

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly or impliedly admitted as prior art against the present invention.

A Cube Satellite (CubeSat) is a class of nanosatellite that is an emerging alternative to conventional satellites for low-Earth orbit satellite communications and satellite missions. The CubeSat is cost-effective, small, and lightweight. CubeSats can communicate with each other in space and with ground stations to carry out various functions, such as remote sensing, space research, and wide-area measurements. The size of a 1-unit CubeSat is about 10×10×10 $cm^3$. The design of an antenna for the CubeSat has stringent limitations due to the size constraints that define its design space. A compact antenna is required for the CubeSat to maintain basic antenna characteristics, such as input impedance matching, bandwidth, and peak gain requirements.

Due to physical and structural requirements of the CubeSat, electrically small antennas with circular polarization (CP) and wideband characteristics are good candidates. The CubeSat requires a CP antenna with wide impedance matching bandwidth. The CP antenna offers more orientation flexibility and matching compared to a linear polarized antenna in many wireless communication applications, including satellites, 5G millimeter-wave, and radio frequency identification. It is a challenge to develop the CP antenna with wideband and compact size characteristics in the ultra-high frequency (UHF) spectrum, which are the core requirements in CubeSat communication.

In one conventional antenna design, a wideband and unidirectional loop antenna was partially loaded with mu-negative (MNG) metamaterial unit cells. To reduce the electrical size of the antenna, a first resonance of the antenna was formed by capacitively loading a conventional one-wavelength loop antenna to excite the mu-zero resonance that is independent of the resonator's size. However, this antenna design generated single linearly polarized waves.

An existing planar leaky-wave antenna (LWA) has been described (See: X. Li, J. Wang, G. Goussetis, and L. Wang, "*Circularly Polarized High Gain Leaky-Wave Antenna for CubeSat Communication*," IEEE Transactions on Antennas and Propagation, pp. 1-1, 2022, incorporated herein by reference in its entirety). The LWA was implemented by etching periodic fan-shaped slots on top of a substrate-integrated waveguide (SIW). These fan-shaped slots exhibited circular polarization radiation with high efficiency over a wide frequency band, however the LWA did not operate at UHF band.

A substrate-integrated waveguide (SIW) antenna utilized middle-point feeding and shorting walls to achieve broadside radiation in the far-field at two distinct frequencies (See: M. V. Kuznetcov, S. K. Podilchak, M. Poveda-Garcia, P. Hilario, C. A. Alistarh, G. Goussetis, and J. L. Gomez-Tornero, "*Compact Leaky-Wave SIW Antenna With Broadside Radiation and Dual-Band Operation for CubeSats*," IEEE Antennas and Wireless Propagation Letters, vol. 20, no. 11, pp. 2125-2129, 2021, is incorporated herein by reference in its entirety). The SIW antenna is matched from 23.2 to 23.5 GHz and 24.8 to 25.2 GHz with realized gains of 8 dBi and 6 dBi, respectively. The SIW antenna is prone to leaky waves and does not operate in the UHF band.

A conventional design of miniaturized slot antennas was described (See: R. Azadegan and K. Sarabandi, "*Design of miniaturized slot antennas*," IEEE Antennas and Propagation Society International Symposium. 2001 Digest. Held in conjunction with: USNC/URSI National Radio Science incorporated herein by reference in its entirety). The miniatured UHF band slot antenna achieved miniaturization by terminating a short slot by an inductor. Inductive loading was realized by coiling the shortened slot line with a length of less than a quarter wavelength. The directivity of the small dipole-slot antenna was equal to that of the infinitesimal Hertzian dipole, and its gain depended on the substrate material specifications and the antenna size. However, the antenna bandwidth, gain and efficiency were limited.

A compact multiband planar antenna was developed for mobile wireless terminals (See: Meeting, "Cat. No. 01CH37229, vol. 4, pp. 565-568", IEEE, 2001 is incorporated herein by reference in its entirety). However, the systems and methods described in these references and other conventional antennas suffer from various limitations including various leaky waves, poor bandwidth and limited gain.

Hence, there is a need for a CubeSat antenna that is compact in size, has wide bandwidth circularized polarization characteristics, and shows good impedance matching. It is one object of the present disclosure to provide a wideband ultra high frequency (UHF) antenna for use with a CubeSat.

SUMMARY

In an exemplary embodiment, a dual feed slot-based circularly polarized wideband ultra high frequency (UHF) antenna for a cubic shaped satellite (Cube-Sat) is described. The dual feed slot-based circularly polarized wideband ultra high frequency (UHF) antenna includes a circuit board having a front side and a back side separated by a dielectric material, a metallic layer configured to cover the back side of the circuit board, wherein the metallic layer is connected to a ground, a hexagonal meandered slot symmetrically formed in the metallic layer, wherein the hexagonal meandered slot includes six legs of equal length, wherein the six legs are configured such that the hexagonal meandered slot includes a first vertex located between a first leg and a second leg, a second vertex located between the second leg and a third leg, a third vertex located between the third leg and a fourth leg, a fourth vertex located between the fourth leg and a fifth leg, a fifth vertex located between the fifth leg and a sixth leg, and a sixth vertex located between the sixth leg and the first leg, a capacitor switchably connected to the metallic layer across the first vertex, a first feed horn connected by a first feed line to a first edge of the front side of the circuit board, wherein an open end of the first feed horn is directed into an inner area of the hexagonal meandered slot between the third vertex and the fourth vertex, and a second feed horn connected by a second feed line to a second edge of the front side of the circuit board, wherein the second edge is opposite the first edge, such that an opening of the second feed horn extends across the hexagonal meandered slot between the sixth vertex and the second vertex.

In another exemplary embodiment, a method for making a dual feed slot-based circularly polarized wideband UHF antenna of dimensions of less than 60 mm by 60 mm for cubic shaped satellites (Cube-Sat) is described. The method includes forming a metallic layer on the back side of a circuit board having a front side and a back side separated by a dielectric material, wherein the metallic layer is connected to a ground. The method includes symmetrically forming a hexagonal meandered slot in the metallic layer, the hexagonal meandered slot including six legs of equal length, and configuring the six legs such that the hexagonal meandered slot includes a first vertex located between a first leg and a second leg, a second vertex located between the second leg and a third leg, a third vertex located between the third leg and a fourth leg, a fourth vertex located between the fourth leg and a fifth leg, a fifth vertex located between the fifth leg and a sixth leg, and a sixth vertex located between the sixth leg and the first leg. The method includes switchably connecting a capacitor to the metallic layer across the first vertex. The method includes connecting a first feed line of a first feed horn to a first edge of the front side of the circuit board and directing an open end of the first feed horn into an inner area of the hexagonal meandered slot between the third vertex and the fourth vertex. The method includes connecting a second feed line of a second feed horn to a second edge of the front side of the circuit board, wherein the second edge is opposite the first edge, such that an opening of the second feed horn extends across the hexagonal meandered slot between the sixth vertex and the second vertex.

In another exemplary embodiment, a method for transmitting ultra high frequency (UHF) signals with a dual feed slot-based circularly polarized wideband UHF antenna of dimensions of less than 60 mm by 60 mm for cubic shaped satellites (Cube-Sat) is described. The method includes forming a first feed horn and a second feed horn in a front side dielectric circuit board, wherein a back side of the dielectric circuit board is covered with a grounded metallic sheet configured with a meandered hexagonal slot, wherein the hexagonal meandered slot is symmetrically formed in the metallic layer, wherein the hexagonal meandered slot includes six legs of equal length, wherein the six legs are configured such that the hexagonal meandered slot includes a first vertex located between a first leg and a second leg, a second vertex located between the second leg and a third leg, a third vertex located between the third leg and a fourth leg, a fourth vertex located between the fourth leg and a fifth leg, a fifth vertex located between the fifth leg and a sixth leg, and a sixth vertex located between the sixth leg and the first leg. The method includes switchably connecting a capacitor to the metallic layer across the first vertex. The method includes transmitting ultra high frequency (UHF) signals by applying signal frequencies in the range of 360 MHz to 470 MHz to the first feed horn and the second feed horn.

The foregoing general description of the illustrative embodiments and the following detailed description thereof are merely exemplary aspects of the teachings of this disclosure, and are not restrictive.

BRIEF DESCRIPTION OF THE DRAWINGS

A more complete appreciation of this disclosure and many of the attendant advantages thereof will be readily obtained as the same becomes better understood by reference to the following detailed description when considered in connection with the accompanying drawings, wherein.

DETAILED DESCRIPTION

Figure 1A:
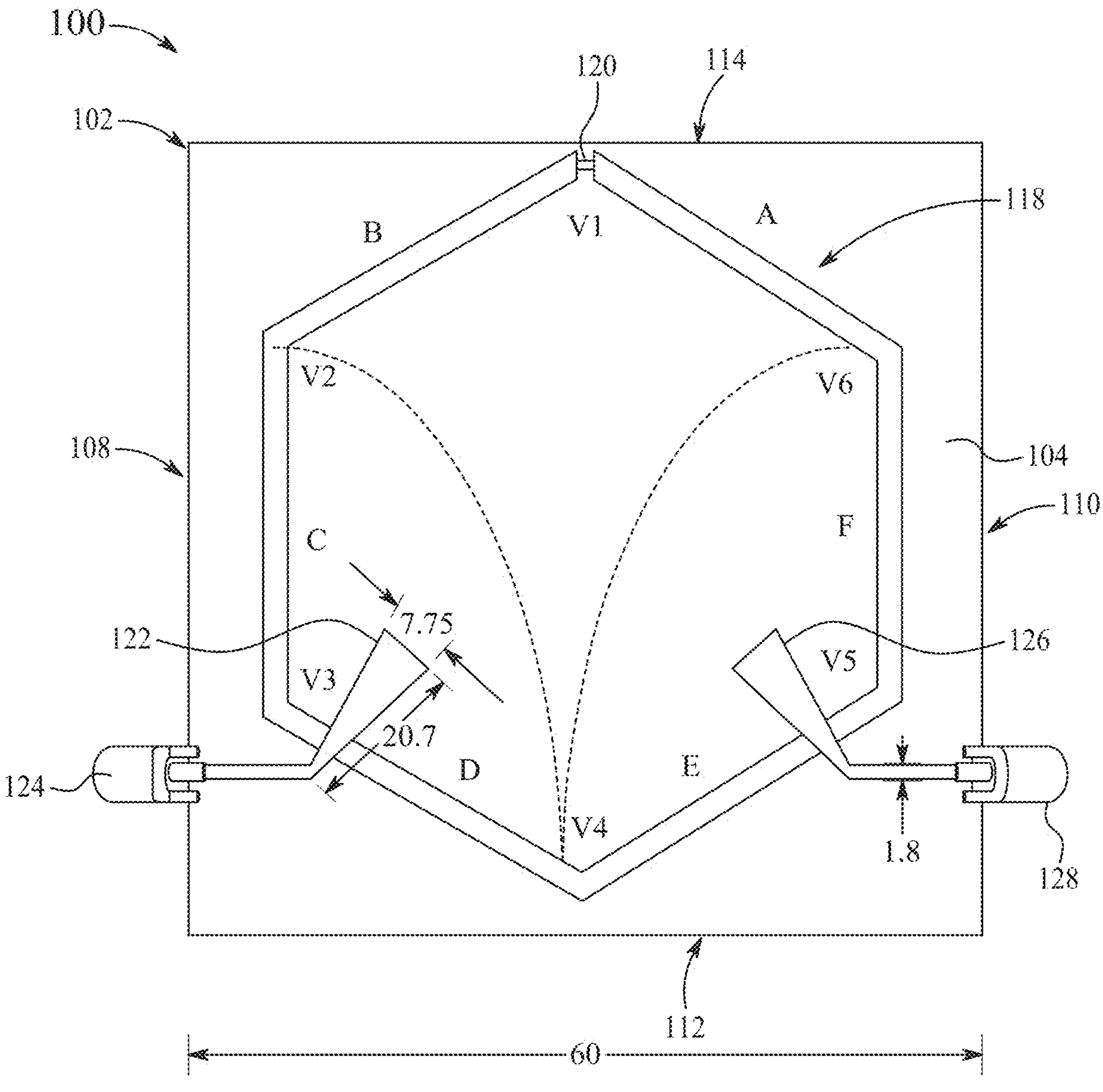
FIG. 1A is a top view of a dual feed slot-based circularly polarized wideband ultra high frequency (UHF) antenna, according to certain embodiments.

In the drawings, like reference numerals designate identical or corresponding parts throughout the several views. Further, as used herein, the words "a," "an" and the like generally carry a meaning of "one or more," unless stated otherwise.

Furthermore, the terms "approximately," "approximate," "about," and similar terms generally refer to ranges that include the identified value within a margin of 20%, 10%, or preferably 5%, and any values therebetween.

CubeSats are a class of spacecraft called nanosatellites. CubeSats are built to standard dimensions (Units or "U") of about 10 cm×10 cm×10 cm. CubeSats can be 1 U, 2 U, 3 U, or 6 U in size, and typically weigh less than 1.33 kg (3 lbs.) per U.

Aspects of this disclosure are directed to a dual feed slot-based circularly polarized wideband ultra-high frequency (UHF) antenna and a method for making the dual feed slot-based circularly polarized wideband UHF antenna. A Cubesat equipped with the antenna is also described, as are methods of transmitting and receiving signals with a CubeSat having the dual feed slot-based circularly polarized wideband UHF antenna. The antenna of the present disclosure has a compact structure, which makes the antenna a suitable candidate for CubeSat applications. The antenna includes a thin hexagonal slot and two feeding transmission lines. In order to achieve a circular polarized (CP) antenna, the two feeding transmission lines are placed symmetrically with respect to the hexagonal slot. The shape and location of the feeding transmission lines, and the hexagonal slot are determined using a parametric analysis. To achieve wideband characteristics with a compact size, the hexagonal slot is constructed with capacitive loading. The antenna is configured to provide both right-hand circular polarization and left-hand circular polarization. The antenna provides a good impedance matching bandwidth from 360 MHz to 470 MHz with a 3 dB axial ratio.

In various aspects of the disclosure, definitions of one or more terms that will be used in the document are provided below.

The term "decibel (or dB)" is a unit used to measure the ratio of input to output power. dB measures the intensity of the power level of an electrical signal by comparing it to a given scale. For example, an amplifier causes a gain in power measured in decibels and it is indicated by a positive number. In another example, cables can cause a loss of power. This is measured in negative dB.

The term "dBi" is defined as the gain of an antenna system relative to an isotropic radiator at radio frequencies. The dBi is an abbreviation for "decibels relative to isotropic". The dBi is based on the decibel, a logarithm i measure of relative power. Antenna manufacturers use dBi to measure antenna performance.

Figure 1B:
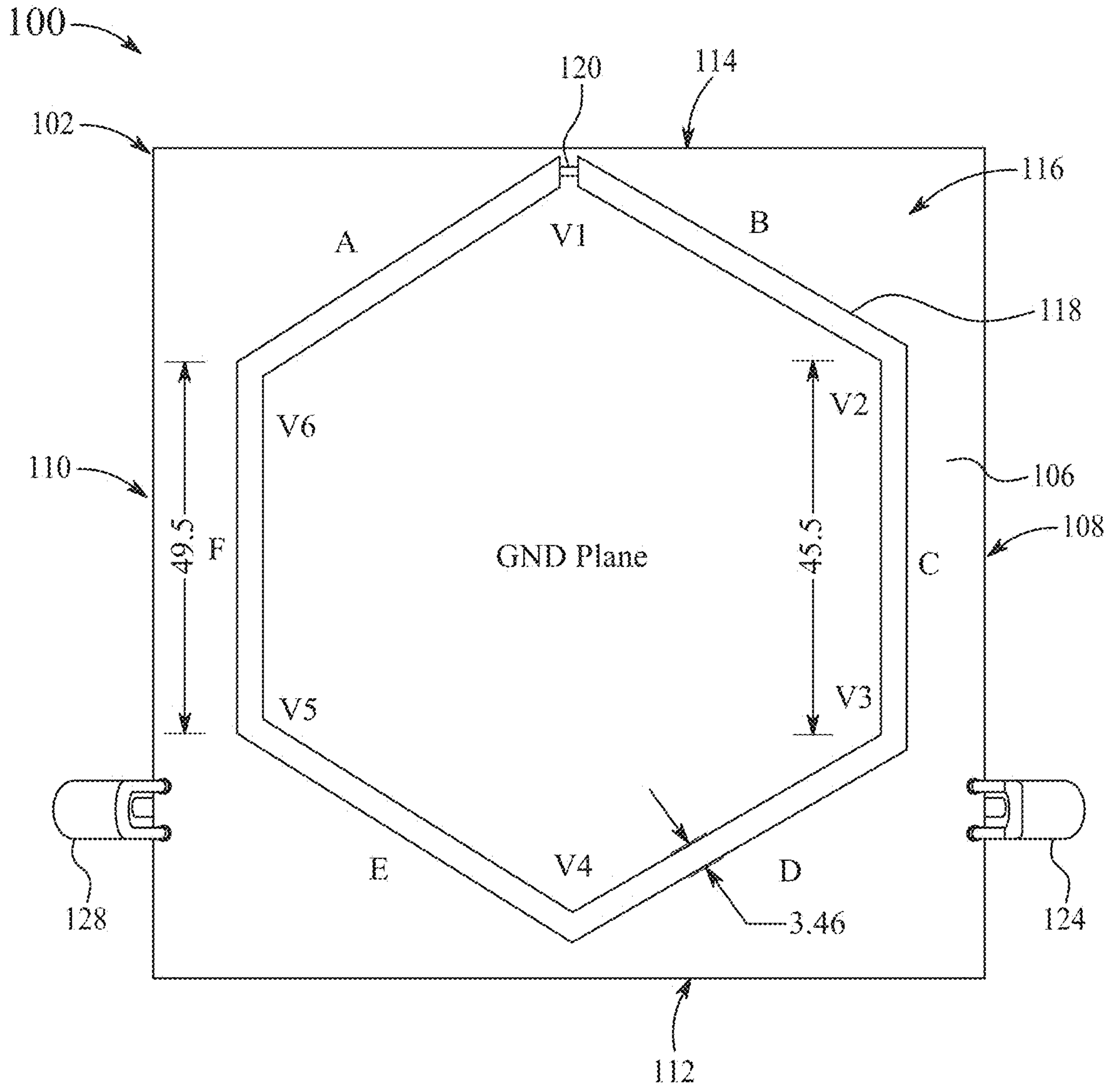
FIG. 1B is a bottom view of the dual feed slot-based circularly polarized wideband UHF antenna, according to certain embodiments.

FIG. 1A to FIG. 1B illustrate an overall configuration of the dual feed slot-based circularly polarized wideband UHF antenna for a cube-shaped satellite (CubeSat).

FIG. 1A illustrates a top view of the dual feed slot-based circularly polarized wideband UHF antenna, according to certain embodiments (hereinafter interchangeably referred to as "the UHF antenna 100"), according to one or more aspects of the present disclosure. FIG. 1B is a bottom view of the UHF antenna 100, according to certain embodiments. In an aspect, the UHF antenna 100 has dimensions of less than 60 mm by 60 mm. FIG. 1A may be read in conjunction with FIG. 1B for a better understanding. In the drawings of FIG. 1A, and FIG. 1B, dimensions shown are for the example of a 60×60 $mm^2$ circuit board and should not be construed as limiting. For a circuit board less than or greater than 60×60 $mm^2$, the dimensions are proportionately smaller or greater respectively. In an aspect, the total length or width of the UHF antenna 100 is 0.081, at 435 MHz which is very compact compared to the conventional antennas.

As shown in FIG. 1A-FIG. 1B, the UHF antenna 100 includes a circuit board 102, a metallic layer 116, a hexagonal meandered slot 118, a capacitor 120, a first feed horn 122, and a second feed horn 126.

The circuit board 102 has a front side 104 and a back side 106. In an aspect, the front side 104 and the back side 106 are separated by a dielectric material. The circuit board 102 has a first edge 108, a second edge 110, a third edge 112, and a fourth edge 114. In an example, the circuit board 102 is a Rogers RO4350 substrate (fabricated by Rogers Corporation, located at 2225 W Chandler Blvd, Chandler, Arizona, United States). In an example, the circuit board 102 uses a substrate material having a relative permittivity ($\varepsilon_r$) of 3.48 and loss tangent of 0.0036. The dimensions of the circuit board 102 are less than or equal to 60×60 $mm^2$. The dimensions of FIGS. 1A-1B are based on a circuit board of 60×60 $mm^2$ and are merely exemplary. For a circuit board less than 60×60 $mm^2$, the dimensions are proportionately smaller. In an aspect, the Rogers RO4350 has a size of 60×60×1.52 $mm^3$.

The metallic layer 116 is configured to cover the back side 106 of the circuit board 102. The metallic layer 116 is connected to a ground terminal. The metallic layer 116 is a material which can conduct an electric field, selected from the group of copper, aluminum, silver, metal copper foils, and combinations thereof. In a non-limiting example, the metallic layer 116 has a thickness of 18 microns and is made of copper. In the metallic layer 116, the hexagonal meandered slot 118 is formed. For example, the hexagonal meandered slot 118 is fabricated in the metallic layer 116 using a PCB laser etching and milling machine (See: LPKF Prototyping machine manufactured by LPKF Laser & Electronics, located at Osteriede 7, 30827 Garbsen, Germany). In an aspect, the hexagonal meandered slot 118 is covered with an epoxy coating that protects the surface edges of the hexagonal meandered slot 118 from any damage.

The hexagonal meandered slot 118 is symmetrically formed in the metallic layer 116 and is preferably equiangular. The hexagonal meandered slot 118 includes six legs (A-F) preferably of substantially equal length. In an aspect, each interior angle between the two adjacent legs is 120 degrees. For example, the six legs (A-F) include a first leg (A), a second leg (B), a third leg (C), a fourth leg (D), a fifth leg (E), and a sixth leg (F). The six legs (A-F) are configured such that the hexagonal meandered slot 118 includes six vertices (V1-V6). In an exemplary connection implementation, a first vertex V1 is located between the first leg (A) and the second leg (B). A second vertex V2 is located between the second leg (B) and a third leg (C). A third vertex V3 is located between the third leg (C) and a fourth leg (D). A fourth vertex V4 is located between the fourth leg (D) and a fifth leg (E). A fifth vertex V5 is located between the fifth leg (E) and a sixth leg (F). A sixth vertex V6 is located between the sixth leg (F) and the first leg (A). In an aspect, the hexagonal meandered slot 118 has a width in the range of 3 mm to 4 mm. For example, the hexagonal meandered slot 118 has a width of 3.5±0.2 mm or 3.46 mm. In an aspect, the inner length of leg of the hexagonal meandered slot 118 is 43-47 mm, preferably 45±1 mm, or 45.5±0.2 mm. In an example, the outer length of each leg of the hexagonal meandered slot 118 is 48-50 mm, preferably 49±0.5 mm or 49.5±0.1 mm. Each leg is of equal length.

The hexagonal meandered slot 118 is configured to resonate at a signal frequency selected from a group of signal frequencies. For example, the signal frequencies are dependent on a value of capacitance of the capacitor 120. By varying the capacitance value of the capacitor 120, the signal frequency may be changed, and as a result, the UHF antenna 100 is able to be tuned to different signal frequencies.

The capacitor 120 is switchably connected to the metallic layer 116 across the first vertex V1. In an aspect, the capacitor 120 is connected to the hexagonal meandered slot 118. In an aspect, the capacitor 120 has a capacitance value selected from a group consisting of 3 pF, 5 pF, 8 pF, 12 pF, 14 pF, and 16 pF. For example, the capacitance value of the capacitor 120 is selected to be 12 pF. In some examples, the capacitor 120 is a variable capacitor. The capacitor 120 is configured to reduce an electrical size of the hexagonal meandered slot 118 and improves the impedance matching bandwidth. In an aspect, the UHF antenna 100 is configured to operate in a range of 550 MHz to 650 MHz frequency band without capacitive loading. In an example, the UHF antenna 100 is configured to operate in a range of 360 MHz to 470 MHz frequency band with capacitive loading. In an aspect, the UHF antenna 100 is configured to operate in a left hand circular polarization (LHCP) mode, and a right hand circular polarization (RHCP) mode.

As shown in FIG. 1A, the first feed horn 122 includes a first feed line 124, a first feed end, and a first horn end. The first feed line 124 is connected to the first edge 108 of the front side 104 of the circuit board 102. The first feed end of the first feed horn 122 is connected to the first feed line 124. The first feed horn 122 is connected to the first edge 108 of the front side 104 of the circuit board 102 by the first feed line 124. In an aspect, an open end of the first feed horn 122 is directed into an inner area of the hexagonal meandered slot 118 between the third vertex V3 and the fourth vertex V4. In an aspect, the horn end of the first feed horn 122 makes an angle of 50 to 55 degrees with the first feed line 124. In an example, the first horn end has an opening of 7.75 mm. In some examples, the first horn end has a length of 20.7 mm. In another example, the first feed line 124 has a width of 1.8 mm. In an aspect, the first feed horn 122 is configured to act as a left feed (Feed-1). When the first feed horn 122 is excited and the second feed horn 126 is terminated with a matched load, the UHF antenna 100 operates in the LHCP mode and generates a left hand circular polarized wave (output). The dimensions of the first feed horn are exemplary only and may vary by ±2%.

As shown in FIG. 1B, the second feed horn 126 includes a second feed line 128, a second feed end, and a second horn end. The second feed line 128 is connected to the second edge 110 of the front side 104 of the circuit board 102. The second feed end of the second feed horn 126 is connected to the second feed line. The second feed horn 126 is connected to the second edge 110 of the front side 104 of the circuit board 102 by the second feed line 128. In an aspect, the second edge 110 is opposite the first edge 104, such that an opening of the second feed horn 126 extends across the hexagonal meandered slot 118 between the sixth vertex V6 and the second vertex V2. In an example, the second horn end has an opening of 7.75 mm. In some examples, the second horn end has a length of 20.7 mm. In another example, the second feed line 128 has a width of 1.8 mm. In an aspect, the horn end of the second feed horn 126 makes an angle of 50 degrees with the second feed line. In an aspect, the second feed horn 126 is configured to act as a right feed (Feed-2). When the second feed horn 126 is excited and the first feed horn 122 is terminated with a matched load, the UHF antenna 100 operates in the RHCP mode and generates a right hand circular polarized wave (output). In an example, the feeding transmission lines (the first feed line 124, and the second feed line 128) are modified and optimized to achieve a wideband impedance matching bandwidth. In an operative mode, the hexagonal meandered slot 118 of the UHF antenna 100 is configured to transmit or receive frequency (RF) waves between two points in space. The UHF antenna 100 is configured to either transmit a signal or receive a signal at a time. When the UHF antenna 100 acts as a transmitting antenna, a voltage is applied to the transmitting antenna, the hexagonal meandered slot 118 with the capacitor 120 is configured to generate radio signals which travel to a receiving antenna where the signal is converted back into electrical energy in the form of information. The UHF signals are applied to the first feed horn 122 and the second feed horn 126 formed in the circuit board 102. The UHF signals are transmitted by the ground stations towards the CubeSat. Based upon the excitation of the feed horns, the UHF antenna 100 operates either in the RHCP mode or in the LHCP mode.

When the UHF antenna 100 is working as the receiving antenna, then a propagating electromagnetic field interacts with it. The propagating electromagnetic field generates a varying electric voltage signal at the center of the UHF antenna 100. This voltage signal is an output when the antenna works as a receiver. The frequency of the output voltage signal is the same as the frequency of the receiving EM wave.

In an aspect, the UHF antenna 100 is configured to resonate at a signal frequency selected from the range of 360 MHz to 470 MHz with less than a 3 dB axial ratio when the capacitor 120 is switched ON. In some examples, the UHF antenna 100 is configured to resonate at a signal frequency selected from the range of 560 MHz to 650 MHz when the capacitor 120 is switched OFF.

The capacitor is connected to the metallic material on either side of the slot. One terminal is connected an outer area of the hexagonal slot and the other terminal is connected to an inner area of the hexagonal slot.

In an example, the UHF antenna 100 is configured to resonate at a signal frequency of 435 MHz when the capacitance value of the capacitor 120 is 12 pF.

In an operative aspect, the UHF antenna 100 is a slot based antenna, that is configured to resonate at 435 MHz frequency for UHF band CubeSat communications. The slot based antenna of the present disclosure is easily fabricated, easily integratable with CubeSat structure, has planar structure, has wideband characteristics and omnidirectional radiation patterns which are suitable for UHF band CubeSat communications.

Figure 2:
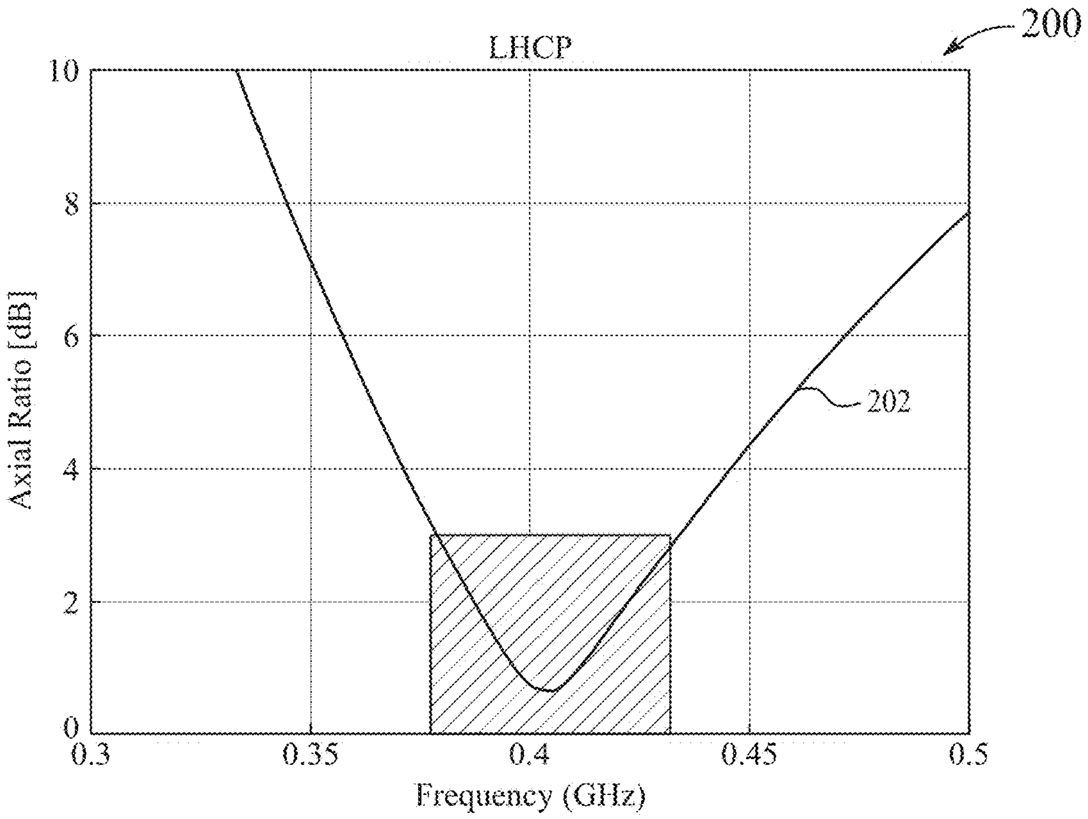
FIG. 2 is an exemplary graph illustrating an axial ratio versus frequency curve for left hand circular polarization (LHCP) mode, according to certain embodiments.

FIG. 2 is an exemplary graph 200 illustrating an axial ratio versus frequency curve for the LHCP mode, according to certain embodiments. When the UHF antenna 100 operates in the LHCP mode, curve 202 illustrates the axial ratio curve of the UHF antenna 100 with respect to the different frequencies. In an example, the axial ratio, for any structure or shape with two or more axes, is the ratio of the length (or magnitude) of those axes to each other, i. e., the longer axis divided by the shorter axis. By measuring the received signals of the UHF antenna 100, when the UHF antenna 100 works in the LHCP or RHCP modes at two different angles, the axial ratio of the UHF antenna 100 can be determined.

As shown in the FIG. 2, the axial ratio decreases with a substantial rise in the frequency. The UHF antenna 100 has a stable axial ratio below 3 dB from 360 MHz to 470 MHz frequency band for the LHCP mode.

Figure 3:
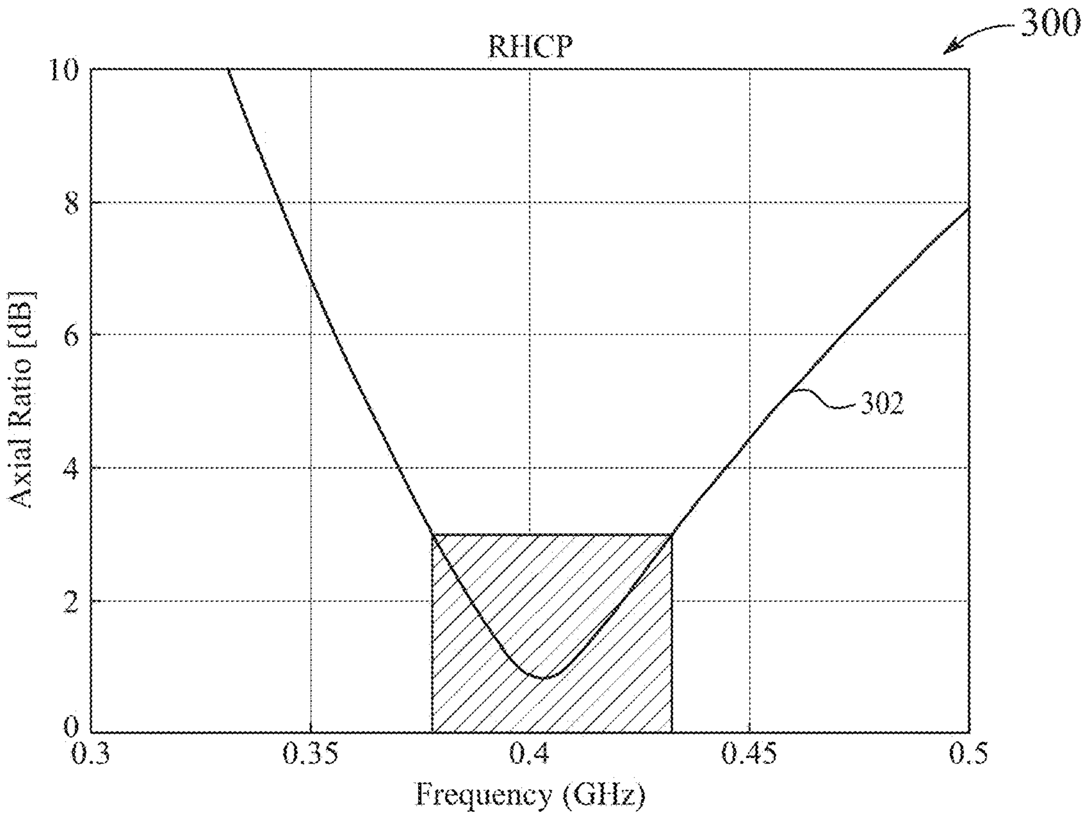
FIG. 3 is an exemplary graph illustrating an axial ratio versus frequency curve for right hand circular polarization (RHCP) mode, according to certain embodiments.

FIG. 3 is an exemplary graph 300 illustrating an axial ratio versus frequency curve for the RHCP mode, according to certain embodiments. When the UHF antenna 100 operates in the RHCP mode, curve 302 illustrates the axial ratio curve of the UHF antenna 100 with respect to the different frequencies. As shown, the axial ratio decreases with a substantial rise in the frequency. The UHF antenna 100 has a stable axial ratio below 3 dB from 360 MHz to 470 MHz frequency band for the RHCP mode.

Figure 4:
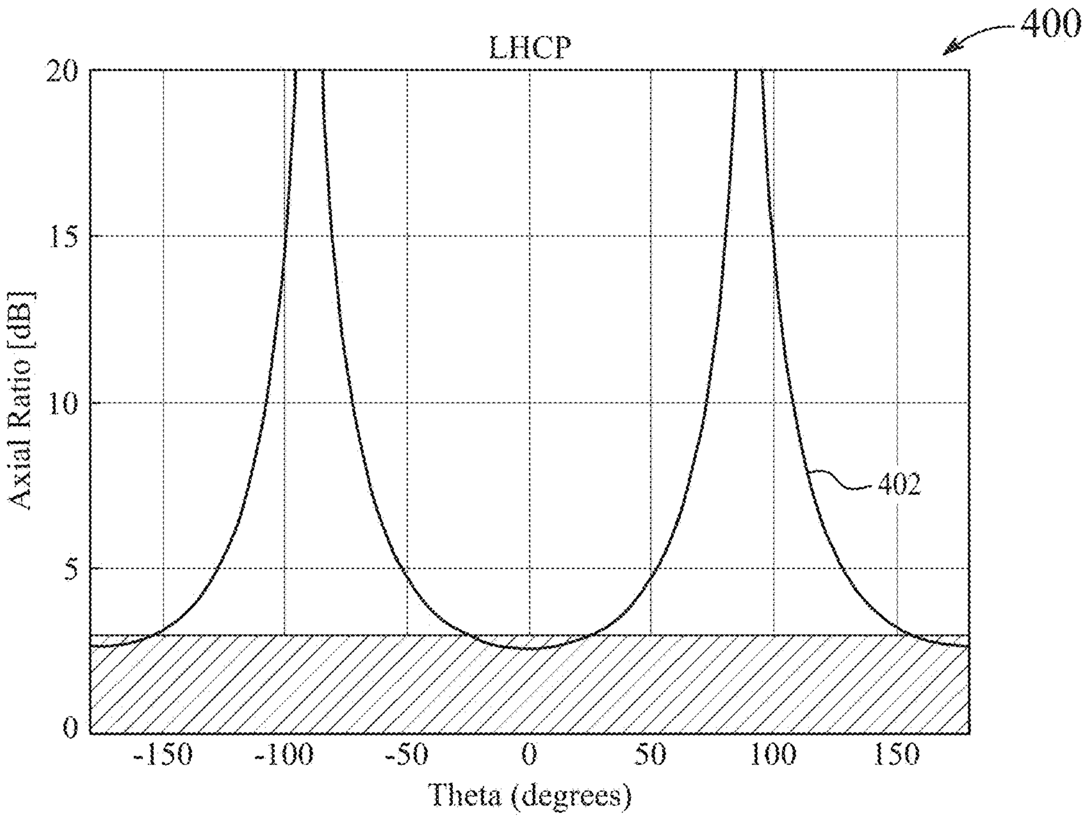
FIG. 4 is an exemplary graph illustrating an axial ratio versus theta curve for LHCP mode, according to certain embodiments.

FIG. 4 is an exemplary graph 400 illustrating an axial ratio versus theta (degrees) curve for the LHCP mode, according to certain embodiments. When the UHF antenna 100 operates in the LHCP mode, curve 402 illustrates the axial ratio of the UHF antenna 100 with respect to the various theta values. In an aspect, the UHF antenna 100 employs a spherical coordinate system.

The spherical coordinate system is a coordinate system having a spherical symmetry. The spherical coordinates system utilizes three distinct spherical coordinates:

R—a magnitude of a distance between an origin and a point (always positive),

θ (theta values)—a polar angle in spherical coordinates—an angle between the z-axis and the vector from the origin to the point (ranges from 0 to 180 degrees), and ϕ(phi values)—an azimuth angle in spherical coordinates—an angle between the x-axis and the projection of the point onto the x-y plane (ranges from 0 to 360 degrees).

The spherical coordinates are useful in determining a response of the UHF antenna 100 in a particular direction. The spherical coordinates are employed in analyzing a radiation pattern that defines the variation of the power radiated by an antenna as a function of the direction away from the antenna.

Figure 5:
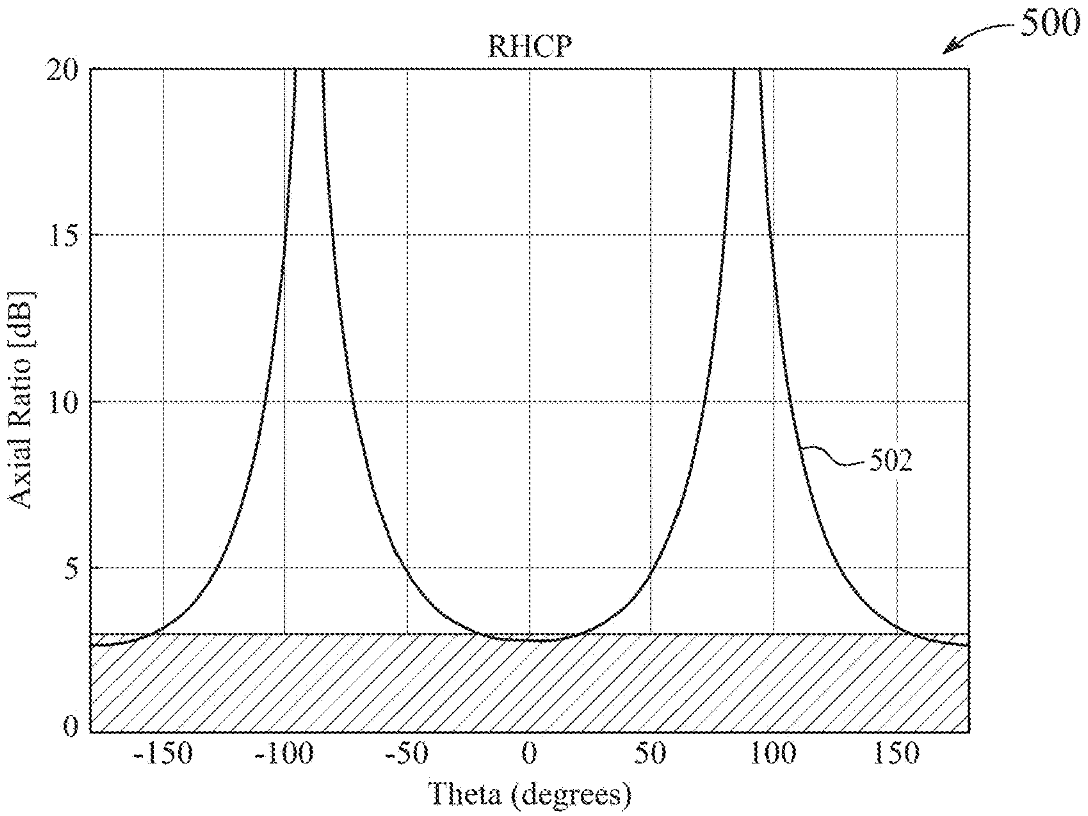
FIG. 5 is an exemplary graph illustrating an axial ratio versus theta curve for RHCP mode, according to certain embodiments.

FIG. 5 is an exemplary graph 500 illustrating an axial ratio versus a theta curve for the RHCP mode, according to certain embodiments. When the UHF antenna 100 operates in the RHCP mode, curve 502 illustrates the axial ratio curve of the UHF antenna 100 with respect to the various theta values. The stability of the axial ratio can also be verified from FIG. 4 and FIG. 5.

FIG. 6A to FIG. 6D illustrate current distributions for the UHF antenna 100 at various phase angles. In order to analyze the antenna's radiation pattern, it is required to measure the magnitude of the power received or transmitted, and the phase angle of the antenna. These measurements should be specified in two orthogonal directions in order to capture all the components (polarizations) of the antenna. The electric fields (E-fields) are orthogonal to the direction of travel in the far field region. For example, the magnitude of the x-component of the E-field is A and the magnitude of the z-component of the E-field is B. The phase of the x-component is D, and the phase of the z-component is F (relative to the oscillation at frequency f). If D=F, the components are in phase and the polarization is linear. If D and F are separated by 90 degrees and the amplitudes are equal, the E-field is circularly polarized.

Figure 6A:
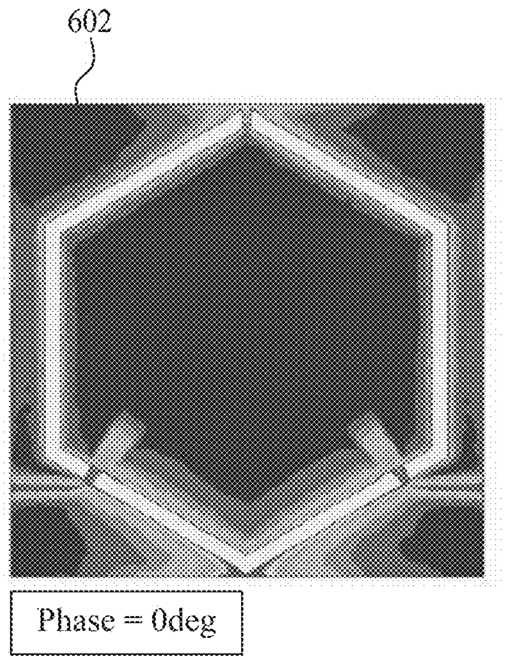
FIG. 6A is an exemplary illustration of surface current distributions at zero degree phase angle, according to certain embodiments.
Figure 6B:
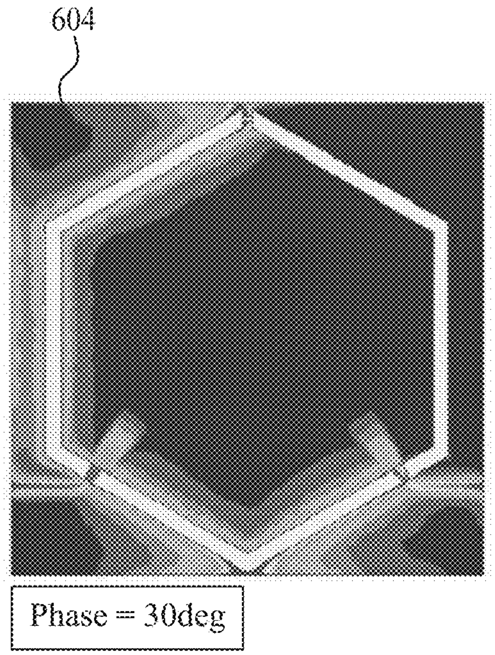
FIG. 6B is an exemplary illustration of surface current distributions at 30 degree phase angle, according to certain embodiments.
Figure 6C:
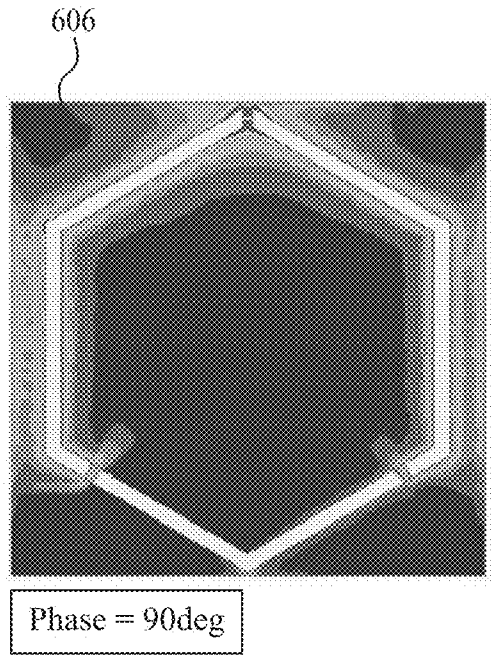
FIG. 6C is an exemplary illustration of surface current distributions at 90 degree phase angle, according to certain embodiments.
Figure 6D:
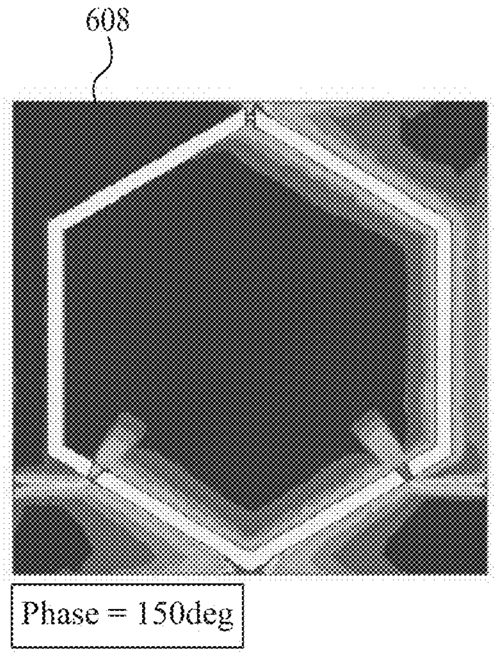
FIG. 6D is an exemplary illustration of surface current distributions at 150 degree phase angle, according to certain embodiments.

In an aspect, the current distributions are plotted at 430 MHz with the phase values of 0°, 30°, 90°, and 150°. FIG. 6A is an exemplary illustration 602 of surface current distributions at a 0° phase angle. FIG. 6B is an exemplary illustration 604 of surface current distributions at a 30° phase angle. FIG. 6C is an exemplary illustration 606 of surface current distributions at a 90° phase angle. FIG. 6D is an exemplary illustration 608 of surface current distributions at a 150° phase angle. It can be seen from FIG. 6A-FIG. 6D, when feeding is carried out via the two feeding ports (the first feed line 124, and the second feed line 128), the surface currents of the hexagonal meandered slot 118 (main radiating part) change with the phase angle.

The following examples are provided to illustrate further and to facilitate the understanding of the present disclosure.

During experimentation, a parametric analysis of the UHF antenna 100 was performed which helped in achieving a better performance in terms of size reduction and widening the bandwidth. In an aspect, the UHF antenna 100 was stimulated using a HFSS (High Frequency Structure Simulator). The UHF antenna 100 was fabricated using a laser milling machine (for example, the LPKF S103, manufactured by LPKF Laser & Electronics, located at Osteriede 7, 30827 Garbsen, Germany). The fabricated UHF antenna 100 was characterized for S-parameters using a vector network analyzer (for example, Agilent FieldFox RF Vector Network Analyzer manufactured by Agilent Technologies, Inc., located at 5301 Stevens Creek Blvd. Santa Clara, CA, United States of America).

Figure 7:
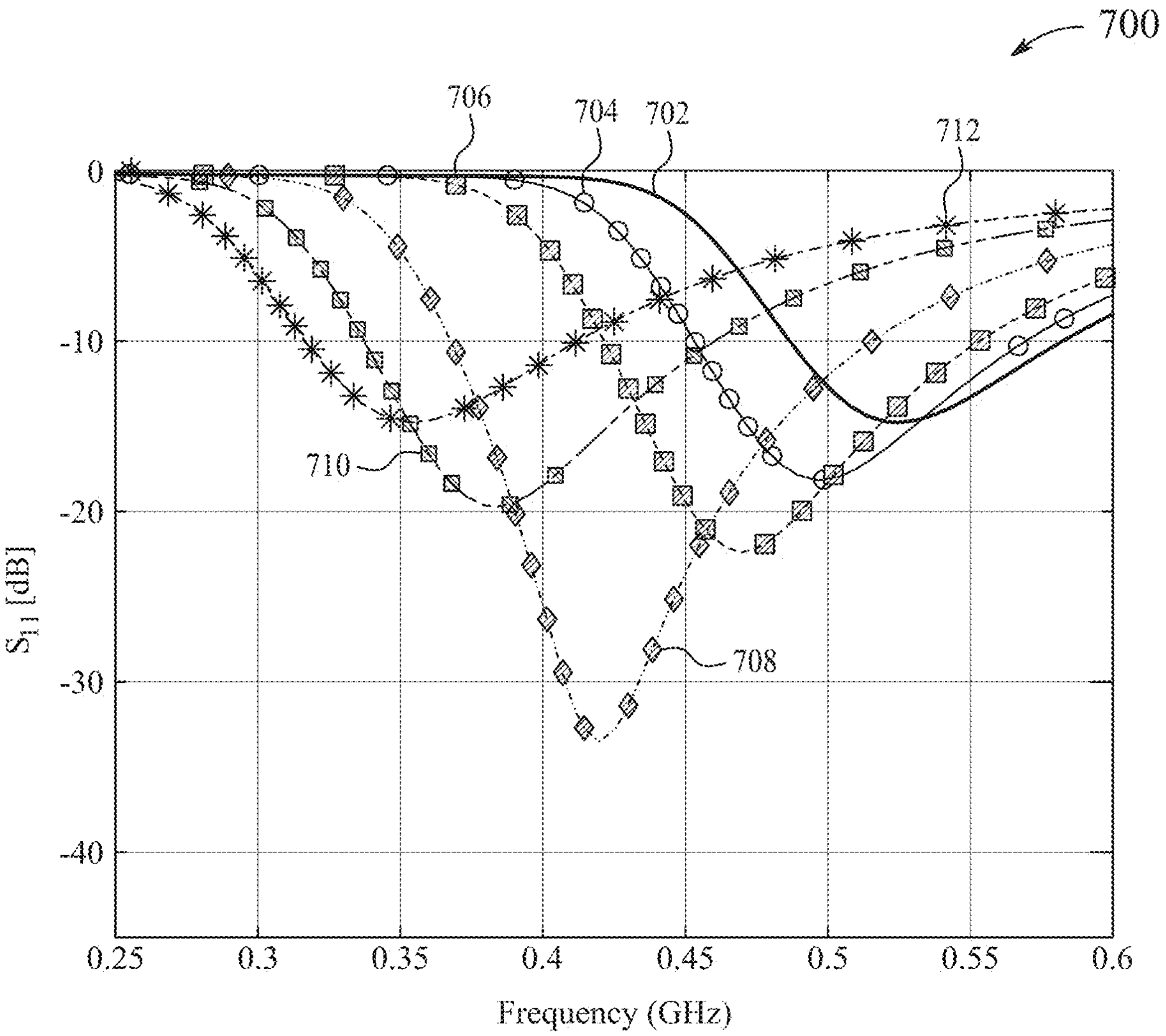
FIG. 7 is an exemplary illustration of measured S parameters ($S_{11}$) for different capacitance value, according to certain embodiments.

FIG. 7 is an exemplary illustration 700 of measured S parameters ($S_{11}$) for different capacitance values, according to certain embodiments. In an aspect, the S-parameters describe the input-output relationship between ports (or terminals) in an electrical system. $S_{11}$ represents how much power is reflected from the antenna, and hence is known as the reflection coefficient. If $S_{11}$=0 dB, then all the power is reflected from the antenna, and nothing is radiated. The capacitor 120 is loaded with the UHF antenna 100. The values of the capacitance of the capacitor 120 are varied to see the effect on the antenna. The reflection coefficient Su curves for the first feed horn 122 are shown in FIG. 7. It can be seen that the $S_{11}$ are dependent on the capacitance values. Signal 702 represents the values of s-parameter ($S_{11}$) when the capacitance value is 3 pF. Further, signal 704 represents values of $S_{11}$ when the capacitance value is 5 pF. Signal 706 represents values of $S_{11}$ when the capacitance value is 8 pF. Signal 708 represents values of $S_{11}$ when the capacitance value is 12 pF. Signal 710 represents values of Su when the capacitance value is 14 pF. Signal 712 represents values of $S_{11}$ when the capacitance value is 16 pF. The UHF antenna 100 may be tuned at other lower frequency bands by changing the capacitance values, thereby making the UHF antenna 100 more flexible to tune at other frequency bands.

By employing the capacitor 120, the UHF antenna 100 provides a better performance in terms of size reduction and widening the bandwidth.

Figure 8A:
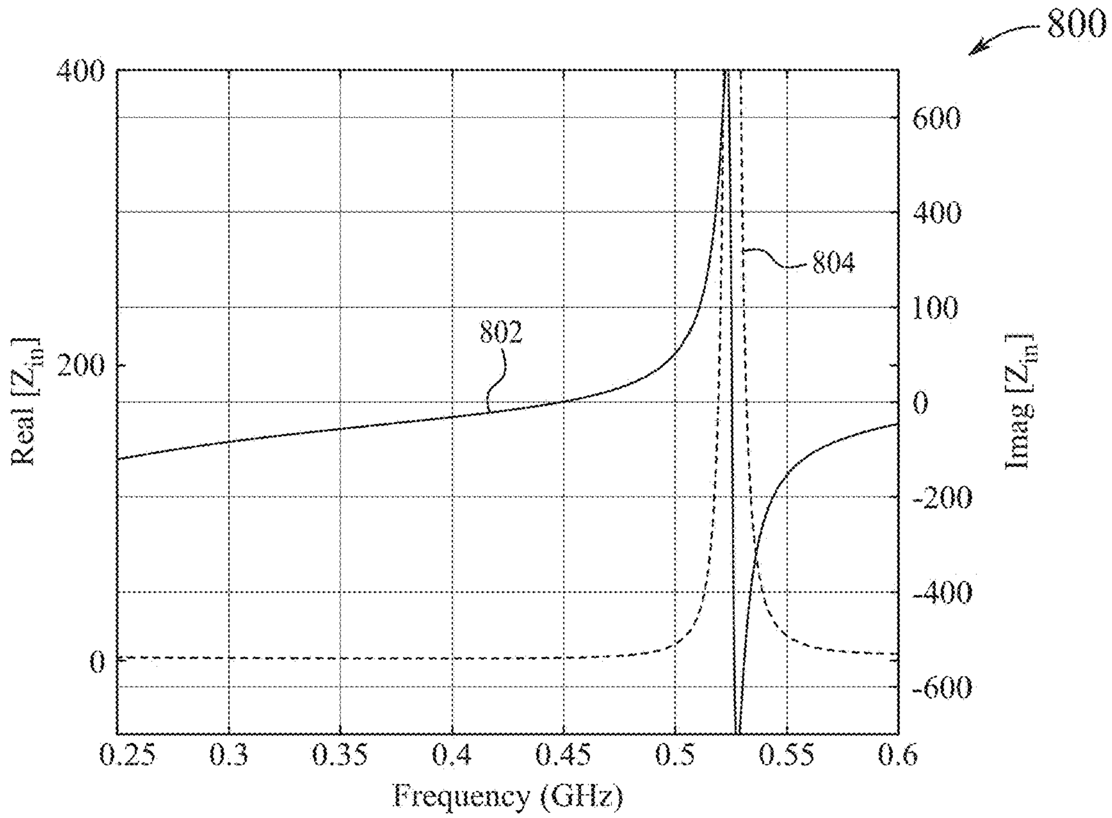
FIG. 8A is an exemplary illustration of an input impedance ($Z_{in}$) curve when a capacitance value is 3 pF, according to certain embodiments.
Figure 8B:
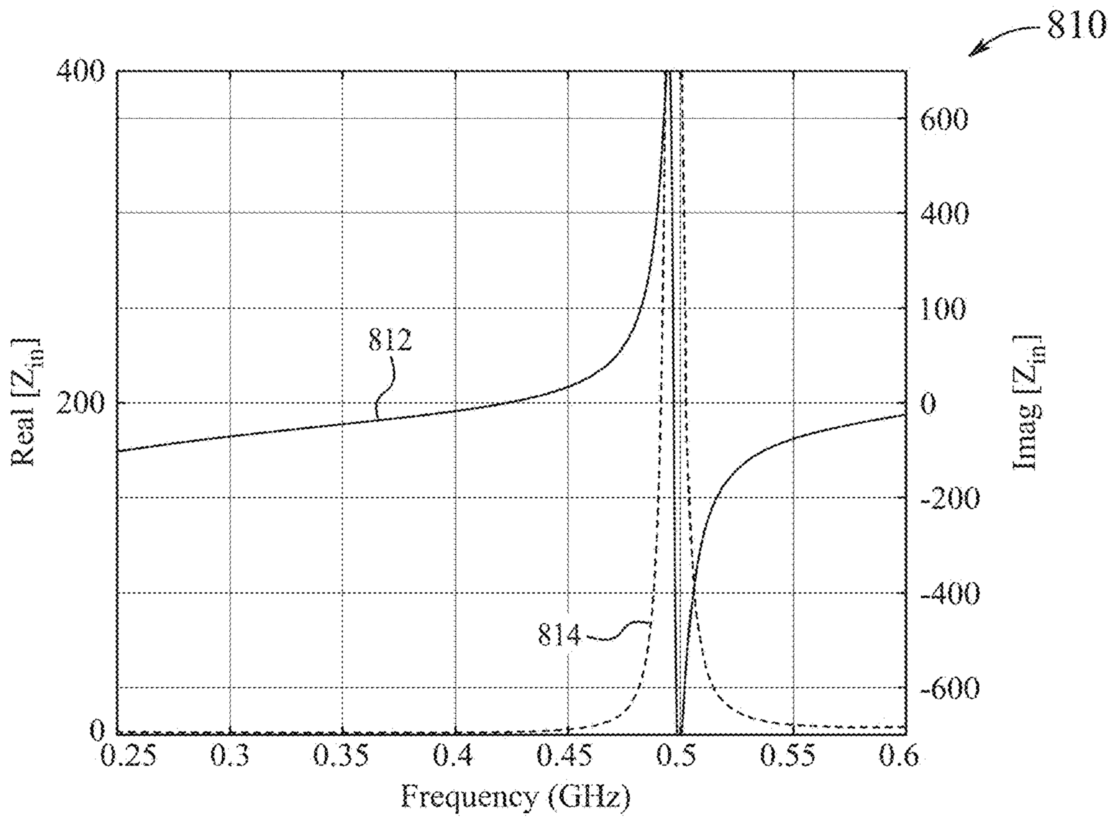
FIG. 8B is an exemplary illustration of the input impedance ($Z_{in}$) curve when the capacitance value is 8 pF, according to certain embodiments.

FIG. 8A-FIG. 8D illustrate different input impedance ($Z_{in}$) curves for the UHF antenna 100 for different capacitance value. FIG. 8A is an exemplary illustration 800 of an input impedance ($Z_{in}$) curve when the capacitance value is 3 pF. Signal 802 illustrates an imaginary part of the impedance when the capacitance value is 3 pF. Signal 804 illustrates a real part of the impedance when the capacitance value is 3 pF. FIG. 8B is an exemplary illustration 810 of the input impedance ($Z_{in}$) curve when the capacitance value is 8 pF, according to certain embodiments. Signal 812 illustrates an imaginary part of the impedance when the capacitance value is 8 pF. Signal 814 illustrates a real part of the impedance when the capacitance value is 8 pF.

Figure 8C:
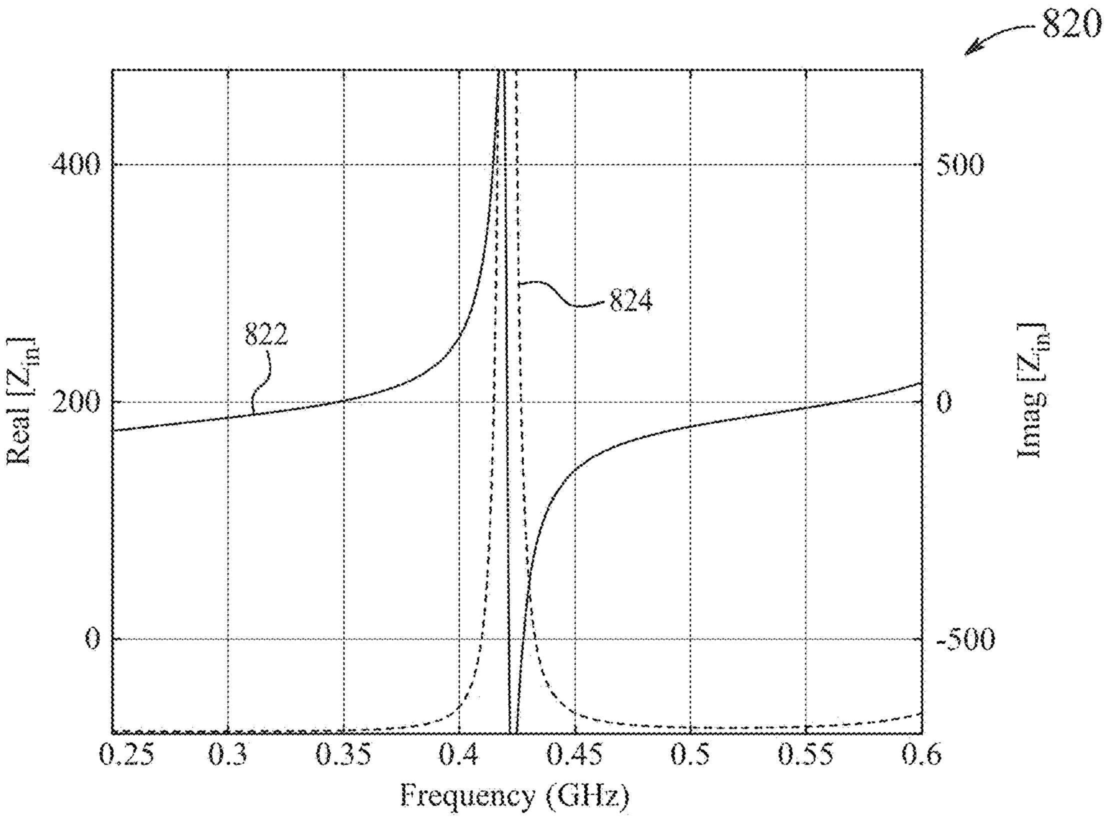
FIG. 8C is an exemplary illustration of the input impedance ($Z_{in}$) curve when the capacitance value is 12 pF, according to certain embodiments.
Figure 8D:
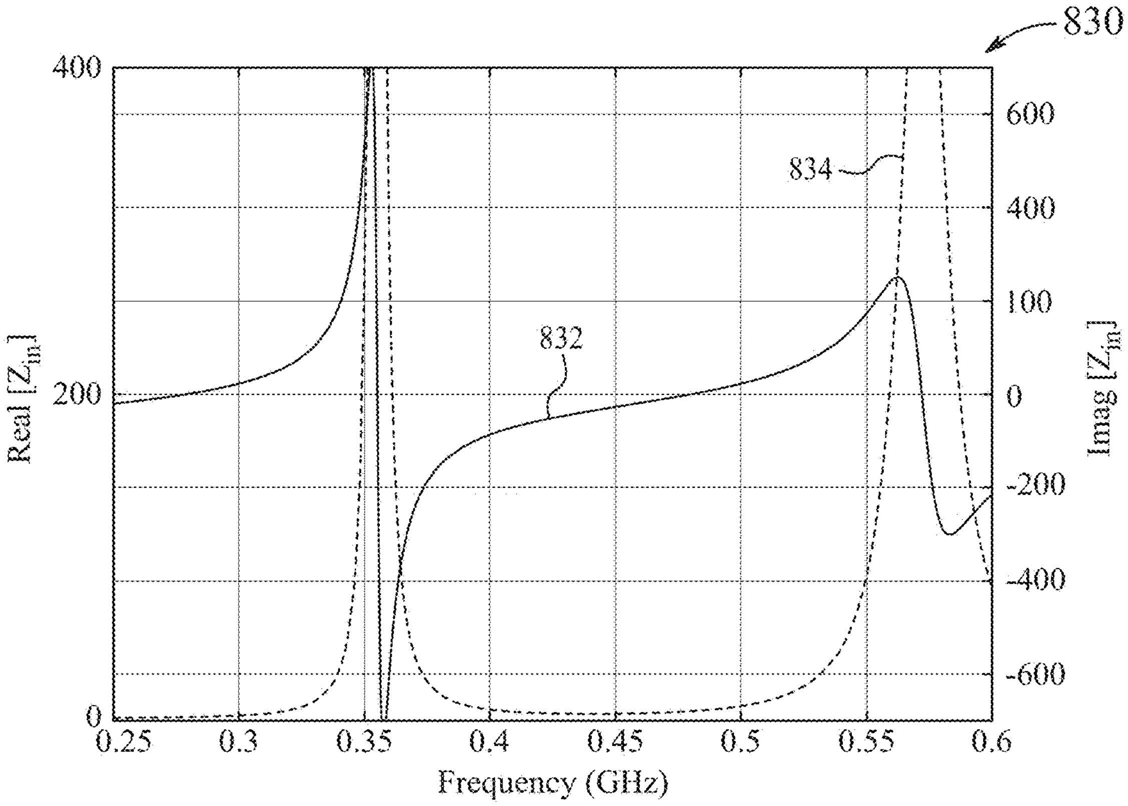
FIG. 8D is an exemplary illustration of the input impedance ($Z_{in}$) curve when the capacitance value is 16 pF, according to certain embodiments.

FIG. 8C is an exemplary illustration 820 of the input impedance ($Z_{in}$) curve when the capacitance value is 12 pF. Signal 822 illustrates an imaginary part of the impedance when the capacitance value is 12 pF. Signal 824 illustrates a real part of the impedance when the capacitance value is 12 pF. FIG. 8D is an exemplary illustration 830 of the input impedance ($Z_{in}$) curve when capacitance value is 16 pF. Signal 832 illustrates an imaginary part of the impedance when the capacitance value is 16 pF. Signal 834 illustrates a real part of the impedance when the capacitance value is 16 pF.

It can be seen from the FIG. 8A-FIG. 8D, with increasing the capacitance values from 3 pF to 16 pF, the resonance frequency is shifted to the lower frequency. The increased capacitance values will increase the effective electrical length of the UHF antenna 100, lowering the resonance frequency. FIG. 8A-FIG. 8D show curves for 3 pF, 5 pF, 8 pF, 12 pF, 14 pF, and 16 pF. In an aspect, the 12 pF capacitance value is selected for the UHF antenna 100 to operate at 435 MHz. From FIG. 8A-FIG. 8D, it can also be observed that the 12 pF capacitance also improves the impedance matching bandwidth compared to without capacitor loading structure.

Figure 9:
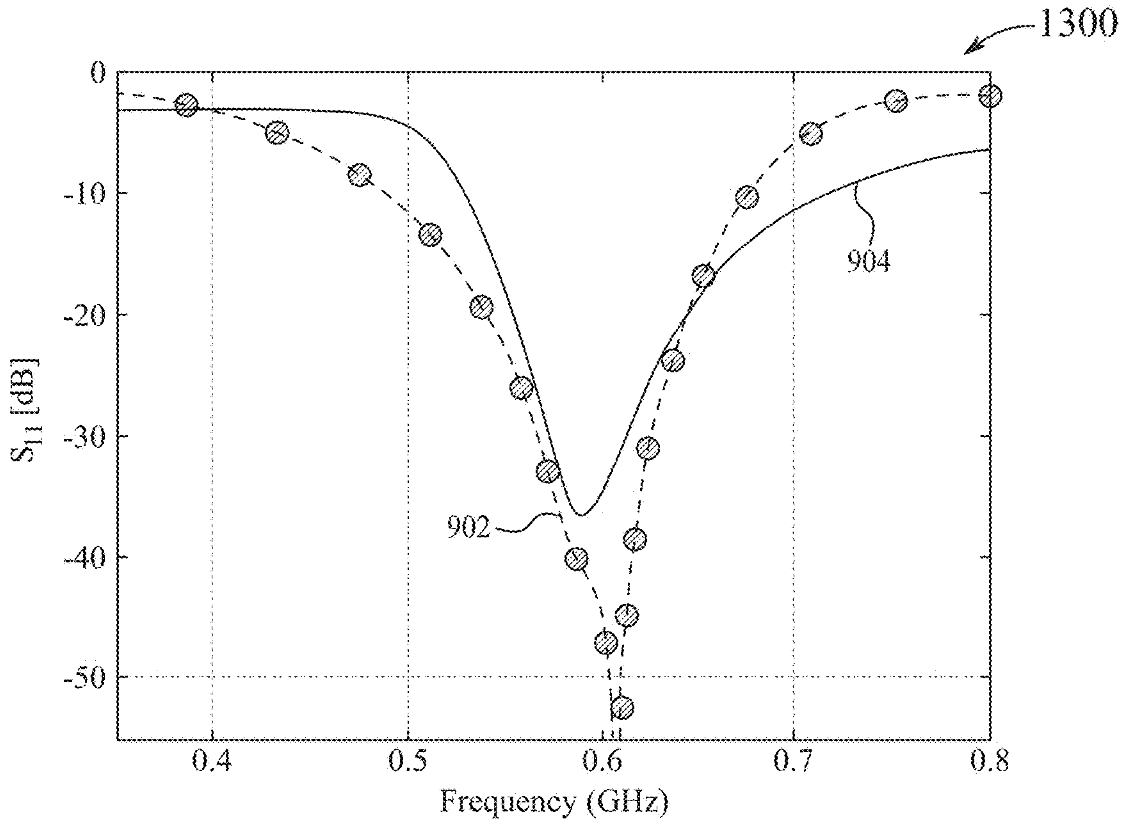
FIG. 9 is an exemplary graph illustrating simulated and measured S parameters ($S_{11}$) without capacitor loading, according to certain embodiments.

FIG. 9 is an exemplary graph 900 illustrating simulated and measured S parameters ($S_{11}$) of the UHF antenna 100 without capacitor loading, according to certain embodiments. Signal 902 represents the simulated values of $S_{11}$. Further, signal 904 represents the measured values of $S_{11}$. As shown in FIG. 9, the measured results are in good agreement with the simulated results. The UHF antenna 100 is configured to cover 550 MHz to 650 MHz for both LHCP and RHCP modes.

Figure 10:
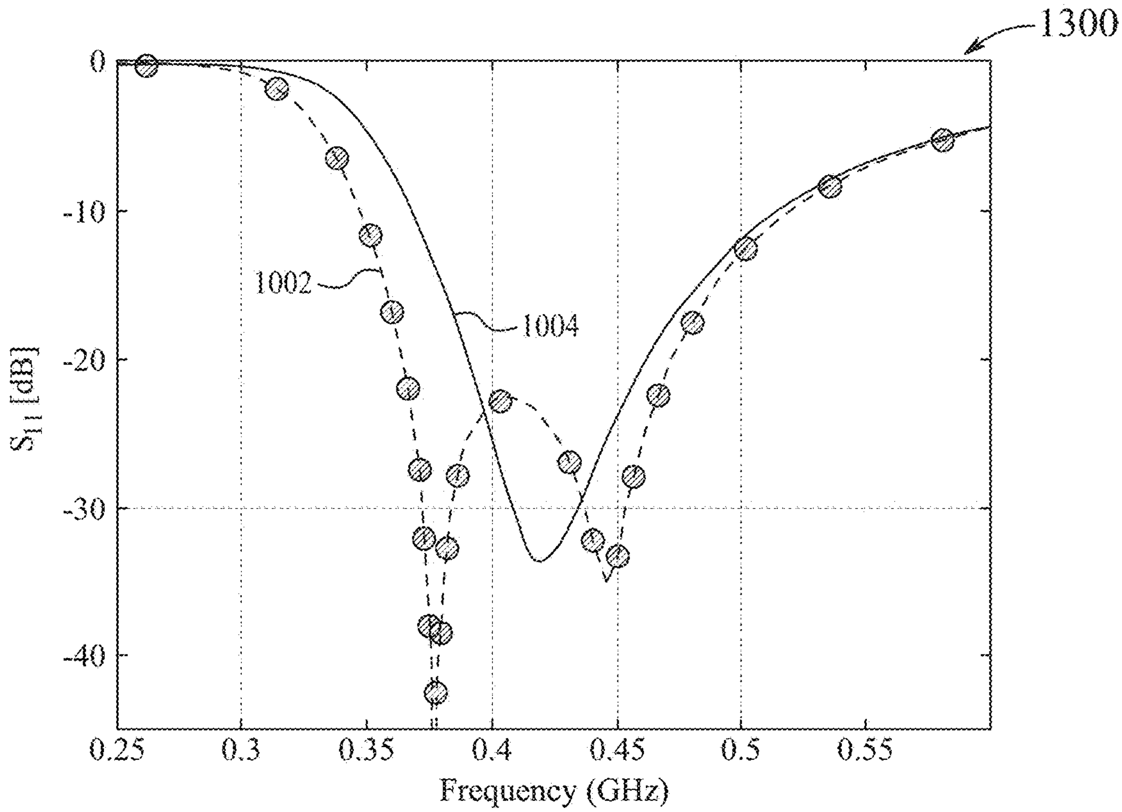
FIG. 10 is an exemplary graph illustrating simulated and measured S parameters ($S_{11}$) with capacitor loading, according to certain embodiments.

FIG. 10 is an exemplary graph 1000 illustrating simulated and measured S parameters ($S_{11}$) of the UHF antenna 100 with capacitor loading, according to certain embodiments. Signal 1002 represents the simulated values of $S_{11}$ with capacitor loading. Further, signal 1004 represents the measured values of Sn with capacitor loading. As shown in FIG. 10, the measured results are in good agreement with the simulated results. The UHF antenna 100 is configured to cover 360 MHz to 470 MHz for both left and right-handed circular polarizations cases. In an example, the 10 dB impedance matching bandwidth is 110 MHz which is very wide at UHF band. In an aspect, due to the symmetry of the UHF antenna 100, the $S_{11}$ and $S_{22}$ are similar.

Figure 11:
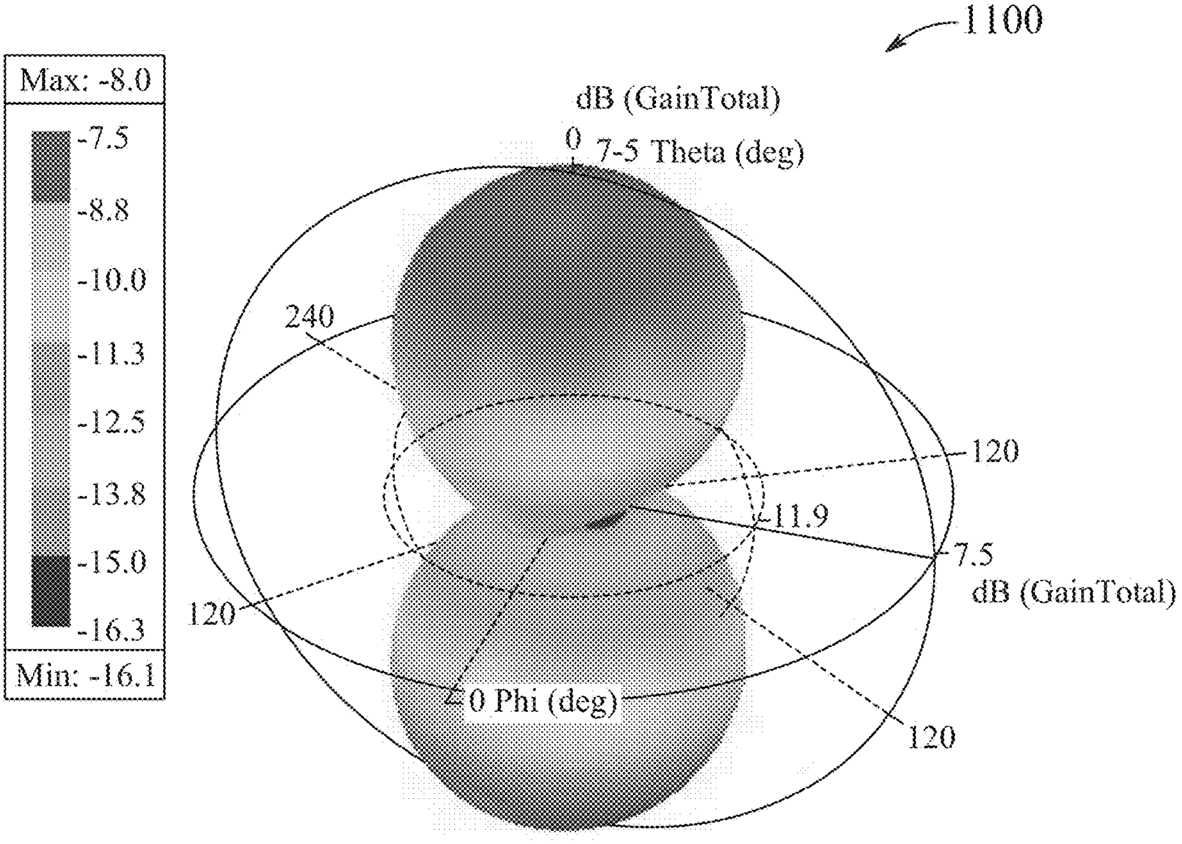
FIG. 11 is an illustration of 3-D gain pattern of the dual feed slot-based circularly polarized wideband UHF antenna, according to certain embodiments.

The UHF antenna 100 was characterized for its far-field radiation patterns parameters. To understand the antenna's radiation pattern, in experimentation, the UHF antenna 100 was provided with input signals. FIG. 11 is an exemplary illustration 1100 of the 3-D gain pattern of the UHF antenna 100. In an example, the UHF antenna 100 is also characterized for far-field radiation patterns in an anechoic chamber. The anechoic chamber is a shielded room that has radio-wave absorbing material applied to the walls, ceiling, and floor. The simulated 3D radiation patterns, given in FIG. 11, show omnidirectional patterns at 435 MHz.

Figure 12:
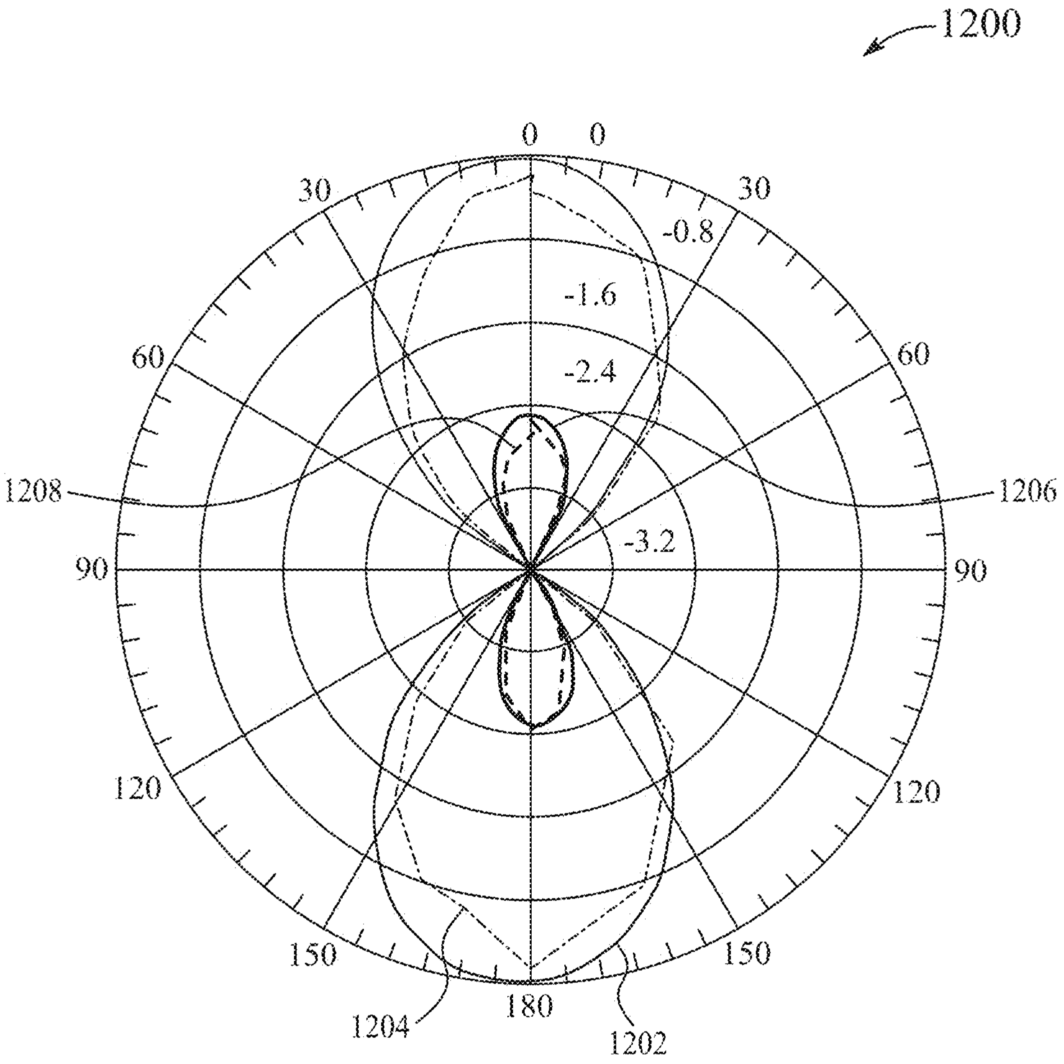
FIG. 12 is an illustration of 2-D simulated and measured radiation patterns of the dual feed slot-based circularly polarized wideband UHF antenna, according to certain embodiments.

FIG. 12 is an exemplary illustration 1200 of 2-D simulated and measured radiation patterns of the dual feed slot-based circularly polarized wideband UHF antenna 100 at 435 MHZ, according to certain embodiments. In an aspect, the simulated and measured 2D radiation patterns for the first feed horn 122 is tuned at 435 MHz are shown in FIG. 12. Signal 1202 represents the simulated radiation pattern for the UHF antenna 100 in XZ plane. Signal 1204 represents the measured radiation pattern for the UHF antenna 100 in XZ plane. Signal 1206 represents the simulated radiation pattern for the UHF antenna 100 in XY plane. Signal 1208 represents the measured radiation pattern for the UHF antenna 100 in XY plane. As shown in FIG. 12, a cross polarization (signals 1206 and 1208) is lower than the cross polarization (signals 1202 and 1204). As shown in FIG. 12, the measured results are in good agreement with the simulated results.

Figure 13:
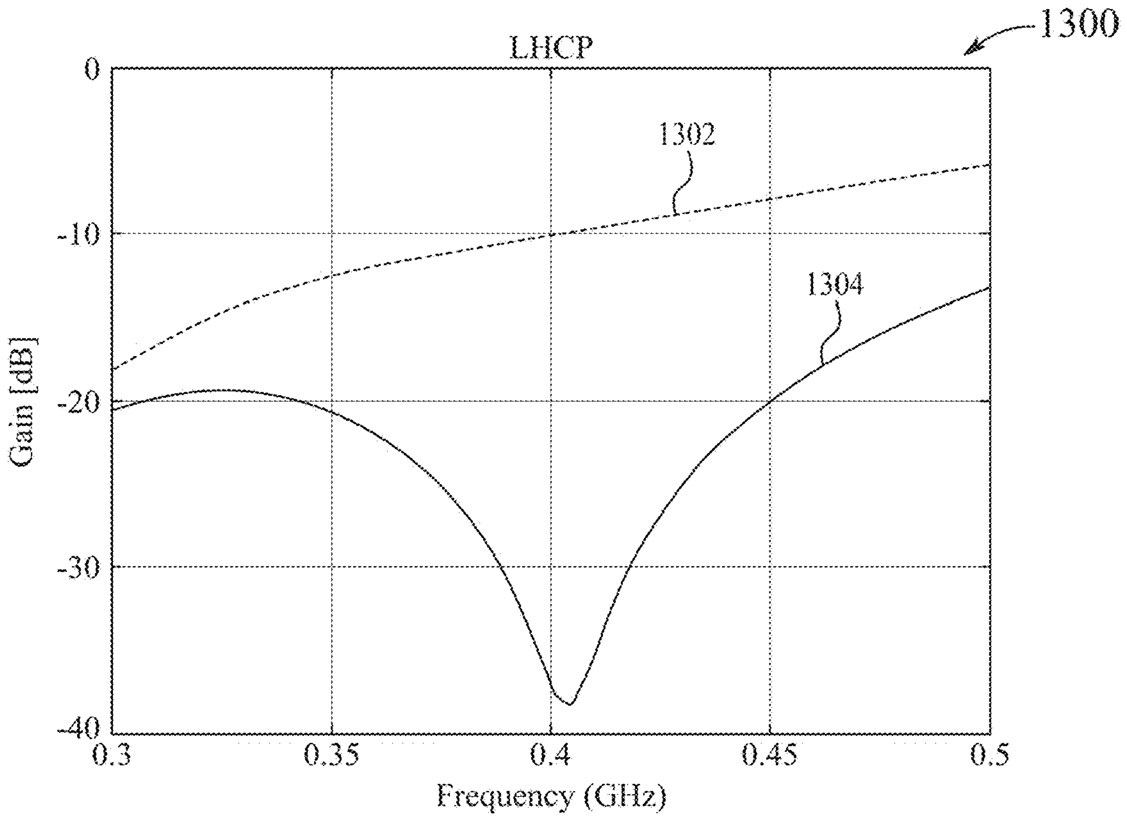
FIG. 13 is an exemplary graph illustrating gain versus frequency curve for the LHCP mode, according to certain embodiments.

FIG. 13 is an exemplary graph 1300 illustrating the gain versus frequency curve for the LHCP mode, according to certain embodiments. Signal 1302 represents a LHCP gain. Signal 1304 represents a RHCP gain. When the first feed horn 122 is excited and the second feed horn 126 is terminated with a matched load, the UHF antenna 100 operates as a left-hand polarized UHF antenna as shown in FIG. 13. The LHCP gain (gain in LHCP mode) is much higher than the RHCP gain (gain in RHCP mode) which verifies that the UHF antenna 100 is circular polarized.

Figure 14:
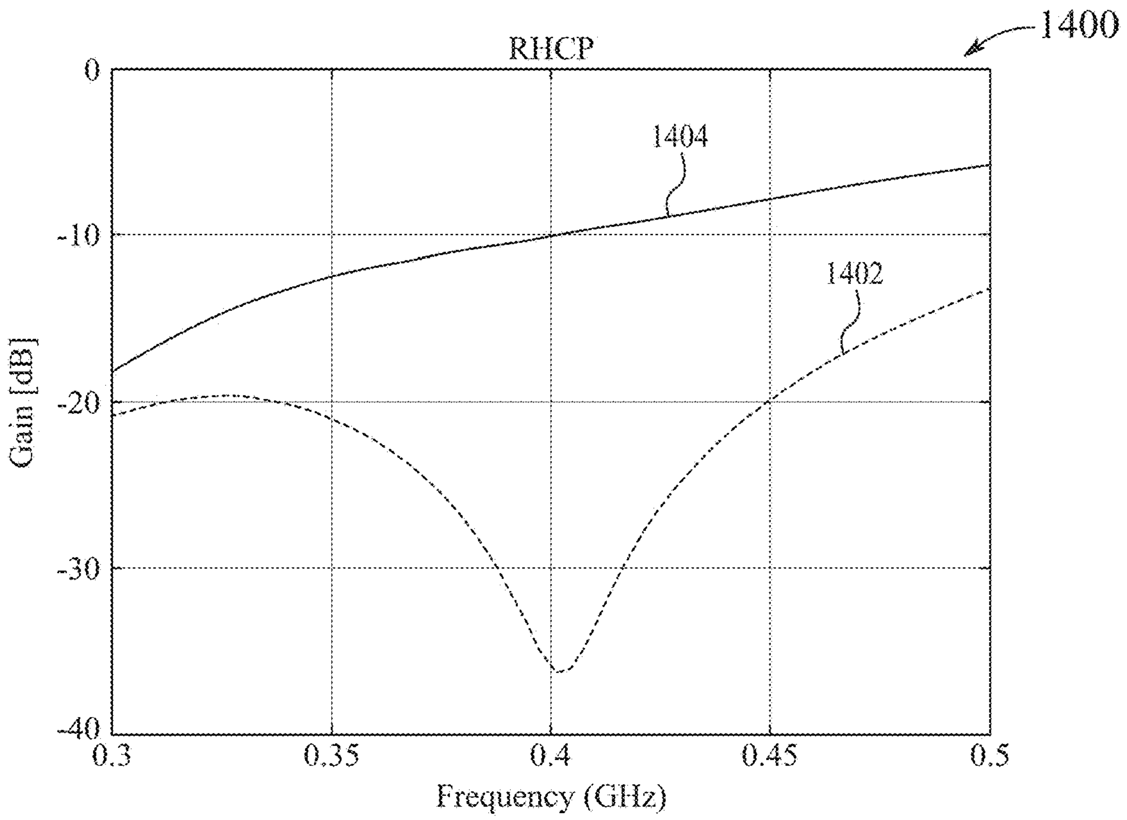
FIG. 14 is an exemplary graph illustrating gain versus frequency curve for the RHCP mode, according to certain embodiments.

FIG. 14 is an exemplary graph 1400 illustrating a gain versus frequency curve for the RHCP mode, according to certain embodiments. Signal 1402 represents the LHCP gain. Signal 1404 represents the RHCP gain. When the second feed horn 126 is excited and the first feed horn 122 is terminated with the matched load, the UHF antenna 100 operates as a right-hand polarized antenna as shown in FIG. 14. The RHCP gain is much higher than the LHCP gain which verifies that the UHF antenna 100 is also a circular polarized antenna. In an aspect, the UHF antenna 100 has gain in the range of 8 dBi to 10 dBi in the covered band.

The performance of the UHF antenna 100 of the present disclosure was compared with the aforementioned existing antenna designs and is summarized in Table 1. It is observed from the Table 1 that the UHF antenna 100 is efficient in comparison to conventional antenna designs.

It can be noticed from the Table 1 that the UHF antenna 100 is very compact in size and provides wideband characteristics at 435 MHz UHF band. Moreover, the UHF antenna 100 is a right and left hand circular polarized while the conventional antennas are only linear polarized.

TABLE 1

Summary of performance comparison

| References | Frequency | Size ($mm^2$) | $S_{11}$ BW | Polarization Sense | CP BW | Antenna Type |
|---|---|---|---|---|---|---|
| X. Li, J. Wang et. al | 28 GHz | 98 × 6 | ≅ 10 GHz | LHCP & RHCP | 10 GHz | Leaky wave |
| M. V. Kuznetcov et. al | 24 GHz | 26 × 33 | ≅ 3 GHz | Linear | NA | Leaky wave |
| R. Azadegan | 300 MHz | 55 × 55 | ≅ 2 MHz | Linear | NA | Slot |

TABLE 1-continued

Summary of performance comparison

| References | Frequency | Size ($mm^2$) | $S_{11}$ BW | Polarization Sense | CP BW | Antenna Type |
|---|---|---|---|---|---|---|
| et. al Meeting IEEE, 2001 | 800 MHz | 335 × 230 | Not given | Linear | NA | Slot |
| The present UHF antenna 100 | 435 MHz | 60 × 60 | 110 MHz | LHCP & RHCP | 100 MHz | Slot |

In an aspect, the present disclosure describes an antenna design procedure having following steps:

1. Selecting a resonating frequency, i.e. 435 MHz.
2. Selecting a hexagonal meandered slot 118 as a resonating structure.
3. Adding and optimizing the location of the feeding structure.
4. Selecting and adding an capacitor 120 to the hexagonal meandered slot 118.
5. Performing a parametric analysis of the antenna structure to achieve wideband axial ratio bandwidth.

The advantages of the present UHF antenna 100 over existing CubeSat antennas include:

1. Compatible with nano avionics UHF antenna systems,
2. Planar structure,
3. No deployable mechanism is required,
4. Circularly polarized antenna design,
5. Switching between LHCP and RHCP.

In an operative aspect, the UHF antenna 100 may be installed in the CubeSat in any of the following different manners:

1. Fit the UHF antenna 100 on a top panel or on a bottom panel of a CubeSat structure;
2. Fit the UHF antenna 100 on a long side of a 3U CubeSat structure;
3. Add a substrate between the UHF antenna 100 and a ground plane of the CubeSat structure.

The integration of the UHF antenna 100 with the solar panel of the CubeSat structure is described below.

Solar panels represent the main source of power for the CubeSat, and thus it is important to reserve available space for their installation on the satellite's body. On the other hand, the antenna is another subsystem of the CubeSat that requires space for installation and is also of great importance in terms of communication. Consequently, integrating antennas with solar panels has proven to be a very efficient approach to using a CubeSat's available space. An integrated solar panel-antenna system keeps the received solar energy loss low. In an aspect, the slot antennas are created, and solar cells are deposited directly on top of the antennas.

The first embodiment is illustrated with respect to FIG. 1A-FIG. 1B. The first embodiment describes a dual feed slot-based circularly polarized wideband ultra high frequency (UHF) antenna 100 for a cubic shaped satellite (Cube-Sat). The UHF antenna 100 includes a circuit board 102 having a front side 104 and a back side 106 separated by a dielectric material; a metallic layer 116 configured to cover the back side of the circuit board 102, wherein the metallic layer 116 is connected to a ground; a hexagonal meandered slot 118 symmetrically formed in the metallic layer 116, wherein the hexagonal meandered slot 118 includes six legs of equal length, wherein the six legs are configured such that the hexagonal meandered slot 118 includes a first vertex V1 located between a first leg and a second leg, a second vertex located between the second leg and a third leg, a third vertex located between the third leg and a fourth leg, a fourth vertex located between the fourth leg and a fifth leg, a fifth vertex located between the fifth leg and a sixth leg, and a sixth vertex located between the sixth leg and the first leg; a capacitor 120 switchably connected to the metallic layer across the first vertex; a first feed horn 122 connected by a first feed line to a first edge 106 of the front side 104 of the circuit board 102, wherein an open end of the first feed horn 122 is directed into an inner area of the hexagonal meandered slot 118 between the third vertex and the fourth vertex; and a second feed horn 126 connected by a second feed line to a second edge 108 of the front side of the circuit board 102, wherein the second edge is opposite the first edge, such that an opening of the second feed horn 126 extends across the hexagonal meandered slot 118 between the sixth vertex and the second vertex.

In an aspect, the capacitor 120 has a capacitance value selected from a group consisting of 3 pF, 5 pF, 8 pF, 12 pF, 14 pF, and 16 pF.

In an aspect, a capacitance value of the capacitor 120 is selected to be 12 pF.

In an aspect, the UHF antenna 100 has dimensions of less than 60 mm by 60 mm.

In an aspect, each feed horn has a length of 20.7 mm and a horn opening of 7.75 mm.

In an aspect, the hexagonal meandered slot 118 has a width in the range of 3 mm to 4 mm.

In an aspect, the UHF antenna 100 is configured to resonate at signal frequencies in the range of 360 MHz to 470 MHz with less than a 3 dB axial ratio when the capacitor 120 is switched ON.

In an aspect, the UHF antenna 100 is configured to resonate at a signal frequency of 435 MHz when a capacitance value of the capacitor 120 is selected to be 12 pF.

In an aspect, the UHF antenna 100 is configured to resonate at signal frequencies in the range of 560 MHz to 650 MHz when the capacitor 120 when the capacitor 120 is switched OFF.

In an aspect, the horn end of the first feed horn makes an angle of 50 degrees with the first feed line.

In an aspect, the horn end of the second feed horn makes an angle of 50 degrees with the second feed line.

The second embodiment is illustrated with respect to FIG. 1A-FIG. 1B. The second embodiment describes a method for making the dual feed slot-based circularly polarized wideband UHF antenna 100 of dimensions of less than 60 mm by 60 mm for cubic shaped satellites (Cube-Sat). The method includes forming a metallic layer 116 on the back side of a circuit board 102 having a front side 104 and a back side 106 separated by a dielectric material, wherein the metallic layer is connected to a ground. The method includes symmetrically forming a hexagonal meandered slot 118 in the metallic layer, the hexagonal meandered slot 118 including six legs of equal length, and configuring the six legs such that the hexagonal meandered slot 118 includes a first vertex located between a first leg and a second leg, a second vertex located between the second leg and a third leg, a third vertex located between the third leg and a fourth leg, a fourth vertex located between the fourth leg and a fifth leg, a fifth vertex located between the fifth leg and a sixth leg, and a sixth vertex located between the sixth leg and the first leg. The method includes switchably connecting a capacitor 120 to the metallic layer across the first vertex. The method includes connecting a first feed line 124 of a first feed horn 122 to a first edge of the front side 104 of the circuit board 102 and directing an open end of the first feed horn 122 into an inner area of the hexagonal meandered slot 118 between the third vertex and the fourth vertex. The method includes connecting a second feed line 128 of a second feed horn 126 to a second edge of the front side 104 of the circuit board 102, wherein the second edge is opposite the first edge, such that an opening of the second feed horn 126 extends across the hexagonal meandered slot 118 between the sixth vertex and the second vertex.

In an aspect, the method further includes selecting a capacitance value of the capacitor 120 from a group consisting of 3 pF, 5 pF, 8 pF, 12 pF, 14 pF, and 16 pF.

In an aspect, the method further includes selecting a capacitance value of the capacitor 120 to be 12 pF.

In an aspect, the method further includes forming each feed horn to have a length of 20.7 mm and a horn opening of 7.75 mm.

In an aspect, the method further includes forming, by laser milling, a width of the hexagonal meandered slot 118 to be in the range of 3 mm to 4 mm.

In an aspect, the method further includes switching the capacitor 120 ON; applying signal frequencies to the first feed line and the second feed line; and configuring the dual feed slot-based circularly polarized wideband UHF antenna to resonate in the range of 360 MHz to 470 MHz with less than a 3 dB axial ratio.

In an aspect, the method further includes selecting a capacitance value of the capacitor 120 to be 12 pF; switching the capacitor 120 ON; and applying signal frequencies to the first feed line and the second feed line which resonate the dual feed slot-based circularly polarized wideband UHF antenna 100 at a 435 MHz.

In an aspect, the method further includes switching the capacitor 120 OFF, applying signal frequencies to the first feed line and the second feed line, and resonating the dual feed slot-based circularly polarized wideband UHF antenna 100 in the range of 360 MHz to 470 MHz with less than a 3 dB axial ratio.

The third embodiment is illustrated with respect to FIG. 1A-FIG. 1B. The third embodiment describes a method for transmitting ultra high frequency (UHF) signals with a dual feed slot-based circularly polarized wideband UHF antenna 100 of dimensions of less than 60 mm by 60 mm for cubic shaped satellites (Cube-Sat). The method includes forming a first feed horn 122 and a second feed horn 126 in a front side 104 dielectric circuit board 102, wherein a back side of the dielectric circuit board 102 is covered with a grounded metallic sheet configured with a meandered hexagonal slot, wherein the hexagonal meandered slot 118 is symmetrically formed in the metallic layer, wherein the hexagonal meandered slot 118 includes six legs of equal length, wherein the six legs are configured such that the hexagonal meandered slot 118 includes a first vertex located between a first leg and a second leg, a second vertex located between the second leg and a third leg, a third vertex located between the third leg and a fourth leg, a fourth vertex located between the fourth leg and a fifth leg, a fifth vertex located between the fifth leg and a sixth leg, and a sixth vertex located between the sixth leg and the first leg. The method further includes switchably connecting a capacitor 120 to the metallic layer across the first vertex. The method further includes transmitting ultra high frequency (UHF) signals by applying signal frequencies in the range of 360 MHz to 470 MHz to the first feed horn 122 and the second feed horn 126.

Obviously, numerous modifications and variations of the present disclosure are possible in light of the above teachings. It is therefore to be understood that within the scope of the appended claims, the invention may be practiced otherwise than as specifically described herein.

The invention claimed is:

1. A dual feed slot-based circularly polarized wideband ultra high frequency (UHF) antenna having dimensions of less than 60 mm by 60 mm for a cubic shaped satellite (Cube-Sat), comprising:

a circuit board having a front side and a back side separated by a dielectric material;

a metallic layer configured to cover the back side of the circuit board, wherein the metallic layer is connected to a ground;

a hexagonal meandered slot symmetrically formed in the metallic layer, wherein the hexagonal meandered slot includes six legs of equal length, wherein the six legs are configured such that the hexagonal meandered slot includes a first vertex located between a first leg and a second leg, a second vertex located between the second leg and a third leg, a third vertex located between the third leg and a fourth leg, a fourth vertex located between the fourth leg and a fifth leg, a fifth vertex located between the fifth leg and a sixth leg, and a sixth vertex located between the sixth leg and the first leg;

a capacitor switchably connected to the metallic layer across the first vertex, wherein the capacitor has a capacitance value of from 3 pF to 16 pF;

a first feed horn connected by a first feed line to a first edge of the front side of the circuit board, wherein an open end of the first feed horn is directed into an inner area of the hexagonal meandered slot between the third vertex and the fourth vertex; and a second feed horn connected by a second feed line to a second edge of the front side of the circuit board, wherein the second edge is opposite the first edge, such that an opening of the second feed horn extends across the hexagonal meandered slot between the sixth vertex and the second vertex.

2. The dual feed slot-based circularly polarized wideband UHF antenna of claim 1, wherein a capacitance value of the capacitor is about 12 pF.

3. The dual feed slot-based circularly polarized wideband UHF antenna of claim 1, wherein each feed horn has a length of about 20.7 mm and a horn opening of about 7.75 mm.

4. The dual feed slot-based circularly polarized wideband UHF antenna of claim 1, wherein the hexagonal meandered slot has a width in the range of about 3 mm to about 4 mm.

5. The dual feed slot-based circularly polarized wideband UHF antenna of claim 1, wherein the antenna is configured to resonate at signal frequencies in the range of 360 MHz to 470 MHz with less than a 3 dB axial ratio when the capacitor is switched ON.

6. The dual feed slot-based circularly polarized wideband UHF antenna of claim 1, wherein the antenna is configured to resonate at a signal frequency of 435 MHz when a capacitance value of the capacitor is selected to be about 12 pF.

7. The dual feed slot-based circularly polarized wideband UHF antenna of claim 1, wherein the antenna is configured to resonate at signal frequencies in the range of 560 MHz to 650 MHz when the capacitor is switched OFF.

8. The dual feed slot-based circularly polarized wideband UHF antenna of claim 1, wherein a horn end of the first feed horn makes an angle of 50 degrees with the first feed line.

9. The dual feed slot-based circularly polarized wideband UHF antenna of claim 1, wherein a horn end of the second feed horn makes an angle of 50 degrees with the second feed line.

* * * * *